United States Patent
Johansen et al.

(10) Patent No.: US 9,594,937 B2
(45) Date of Patent: *Mar. 14, 2017

(54) OPTICAL MARK READER

(71) Applicant: ELECTRO SCIENTIFIC INDUSTRIES, INC., Portland, OR (US)

(72) Inventors: Brian C. Johansen, Hillsboro, OR (US); Kyung Young Kim, Portland, OR (US); Bruce W. Ball, Ann Arbor, MI (US); Justin D. Redd, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,436

(22) Filed: Feb. 24, 2015

(65) Prior Publication Data

US 2015/0248570 A1    Sep. 3, 2015

Related U.S. Application Data

(63) Continuation-in-part of application No. 14/194,455, filed on Feb. 28, 2014, now Pat. No. 9,269,035.

(Continued)

(51) Int. Cl.
*G06K 19/06*    (2006.01)
*G06K 7/10*    (2006.01)

(52) U.S. Cl.
CPC ... *G06K 7/10722* (2013.01); *G06K 19/06178* (2013.01)

(58) Field of Classification Search
CPC ............. G06K 19/06037; G06K 7/14; G06K 7/10851; G06K 7/12; G06K 2019/06255;
(Continued)

(56) References Cited

U.S. PATENT DOCUMENTS 4,110,020 A * 8/1978 Johnson ................. G03B 21/11
                                                    235/462.05
4,818,852 A * 4/1989 Haddock ............... G06K 19/083
                                                    235/462.01

(Continued)

FOREIGN PATENT DOCUMENTS

WO    WO2004/095348 A2    11/2004
WO    WO2008/028158 A2    3/2008
(Continued)

OTHER PUBLICATIONS

Machine translation (Google patents) of WO2013018980 of Byung Ho Park, dated Feb. 7, 2013.

(Continued)

*Primary Examiner* — Karl D Frech

(57) ABSTRACT

Each data point within a two-dimensional code can be represented by a distribution of spots. Each spot can be made small enough to be invisible to the human eye so that the two-dimensional code can be invisible on or within transparent or nontransparent materials. The spots can be spaced at a large distance to increase the signal-to-noise ratio for an optical code reader. A code reader can be adapted to read the spots and determine the data points.

33 Claims, 13 Drawing Sheets

Related U.S. Application Data

(60) Provisional application No. 62/033,989, filed on Aug. 6, 2014.

(58) Field of Classification Search
CPC .......... G06K 7/10881; G06K 7/10871; G03B 27/6285
USPC ..... 235/494, 462.05, 462.01, 462.04, 462.35
See application file for complete search history.

(56) References Cited

U.S. PATENT DOCUMENTS

| | | | |
|---|---|---|---|
| 5,578,809 A * | 11/1996 | Yamaji | G03B 27/6285 |
| | | | 235/454 |
| 5,665,950 A * | 9/1997 | Rottner | G03B 27/6285 |
| | | | 235/375 |
| 5,726,435 A | 3/1998 | Hara et al. | |
| 5,737,122 A | 4/1998 | Wilt et al. | |
| 5,751,585 A | 5/1998 | Cutler et al. | |
| 5,767,483 A | 6/1998 | Cameron et al. | |
| 5,894,530 A | 4/1999 | Wilt | |
| 6,095,417 A * | 8/2000 | Ahlquist | G06K 7/14 |
| | | | 235/454 |
| 6,206,287 B1 * | 3/2001 | Wasula | G06K 7/14 |
| | | | 235/454 |
| 6,433,301 B1 | 8/2002 | Dunsky et al. | |
| 6,706,999 B1 | 3/2004 | Barrett et al. | |
| 6,724,912 B1 | 4/2004 | Carr et al. | |
| 7,019,891 B2 | 3/2006 | Johnson | |
| 7,589,869 B2 | 9/2009 | Johansen et al. | |
| 7,763,179 B2 | 7/2010 | Levy et al. | |
| 8,322,621 B2 | 12/2012 | Olmstead | |
| 8,379,679 B2 | 2/2013 | Zhang et al. | |
| 8,608,077 B2 | 12/2013 | Olmstead | |
| 8,678,287 B2 | 3/2014 | Olmstead | |
| 9,269,035 B2 * | 2/2016 | Redd | G06K 19/06037 |
| 2003/0021440 A1 | 1/2003 | Rhoads | |
| 2003/0053656 A1 | 3/2003 | Levy | |
| 2004/0046024 A1 | 3/2004 | Natsukari et al. | |
| 2004/0181671 A1 | 9/2004 | Brundage et al. | |
| 2005/0065886 A1 | 3/2005 | Andelin et al. | |
| 2006/0213994 A1 | 9/2006 | Faiz et al. | |
| 2007/0038464 A1 | 2/2007 | Sato et al. | |
| 2008/0017619 A1 | 1/2008 | Yamakawa et al. | |
| 2010/0213255 A1 | 8/2010 | Yoo | |
| 2011/0259962 A1 | 10/2011 | Picard et al. | |
| 2012/0211566 A1 | 8/2012 | Hensel et al. | |
| 2012/0327214 A1 | 12/2012 | McIntyre | |
| 2013/0208074 A1 | 8/2013 | Zhang et al. | |
| 2013/0320276 A1 | 12/2013 | Farrell | |
| 2013/0341400 A1 | 12/2013 | Lancaster-Larocque | |

FOREIGN PATENT DOCUMENTS

| | | |
|---|---|---|
| WO | WO2012035552 A2 | 3/2012 |
| WO | WO2013018980 A2 | 2/2013 |

OTHER PUBLICATIONS

The International Search Report of PCT/US2015/017372, dated May 22, 2015, 2 pages.
The Written Opinion of PCT/US2015/017372, dated May 22, 2015, 9 pages.
QR Code-Wikipedia (https://en.wikipedia.org/wiki/QR_code), available before Feb. 28, 2014, 14 pages.
Data Matrix-Wilipedia (https://en.wikipedia.org/wiki/Data_Matrix), available before Feb. 28, 2014, 13 pages.
TBS Total Brand Security, (https://totalbrandsecurity.com), available before Feb. 28, 2014, 1 page.
GS1 general Sepcifications, version 14, Jan. 2014, 478 pages.
Trackinside, Jul. 11, 2014, 3 pages.

* cited by examiner

OPTICAL MARK READER

RELATED APPLICATIONS

This application is a Non-Provisional application of U.S. Provisional Patent Application No. 62/033,989, which was filed on 6 Aug. 2014, the contents of which are herein incorporated by reference in their entirety for all purposes, and this application is a continuation-in-part of U.S. patent application Ser. No. 14/194,455, which was filed on 28 Feb. 2014, the contents of which are herein incorporated by reference in their entirety for all purposes.

COPYRIGHT NOTICE

© 2015 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This application relates to optical readers and, in particular, to systems and methods for reading optical marks, such as marks that are invisible to a human eye.

BACKGROUND

Two-dimensional identification (2DID) codes, such as quick response (QR) codes and GS1 DataMatrix (DM) codes, are types of a matrix barcode that is widely used for product tracking and providing a variety of information. QR codes include filled darkened squares (black squares) arranged within a square grid on a light background and are suitable for high-speed acquisition by an imaging device, such as a camera. In these codes, each square represents a data point. Typical square grid patterns range from 11 to 177 squares per row or column. Patterns in the horizontal and the vertical components of the acquired image can reveal or activate the coded information, such as for commercial tracking, entertainment and transport ticketing, product labeling, product marketing, mobile phone tagging, couponing, displaying text, adding vCard contact information, opening an URL or URI, or composing email or text messages. The QR code is covered by an ISO standard, and its use is license free. QR code generating websites and apps are widely available so users can generate and print their own QR codes for others to scan. (See http://en.wikipedia.org/wiki/QR_code.) An exemplary QR code is shown in FIG. 1.

GS1 DataMatrix codes are also covered by several ISO and IEC standards (such as 15424 and 15459) and are license free for many applications. See http://en.wikipedia.org/wiki/Data_Matrix. GS1 DataMatrix code-generating resources are also widely available. An exemplary GS1 DataMatrix code generated using http://datamatrix.kaywa.com is shown in FIG. 2.

Methods exist for marking these DM or 2DID codes on various materials and in many different sizes, wherein the entire pattern of the 2DID code is larger than 500 microns (µm). For example, some 2DID codes can be printed on labels using traditional print technology, engraved into metal, and carved into tombstones.

Optical code readers are available for reading such optical codes from the exterior surfaces that support them. The encoding and decoding schemes are generally robust and include embedded cyclic redundancy check (CRC) error correction to ensure data integrity, for accurately printed codes. For example, international standards for encoding and decoding certain types of these 2DID codes can be found at http://www.gsl.org/docs/gsmp/barcodes/GS1_General_Specifications.pdf. However, if the 2DID codes contain printing errors or inconsistencies, the 2DID codes may be much more difficult, if not impossible, to decode.

SUMMARY OF DISCLOSURE

This summary is provided to introduce a selection of concepts in a simplified form that are further described in the detailed description of the exemplary embodiments. This summary is not intended to identify key or essential inventive concepts of the claimed subject matter, nor is it intended for limiting the scope of the claimed subject matter.

In some embodiments, a two-dimensional code is represented by a distribution of spots on or within a substrate having a contrasting background, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots.

In some alternative, additional, or cumulative embodiments, a method for marking a substrate with a two-dimensional identification code, comprises generating laser pulses, and directing the laser pulses at the substrate to form a distribution of spots on or within the substrate, wherein the distribution of spots represents the two-dimensional code and comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots.

In some alternative, additional, or cumulative embodiments, a laser micromachining system for marking a substrate with a two-dimensional identification code on or within a substrate of a workpiece, wherein the two-dimensional code includes an array of geometrically-shaped areas, wherein some the geometrically-shaped areas are designated and some of the geometrically-shaped areas are undesignated, the laser micromachining system comprises: a laser for generating laser pulses along a beam axis; a workpiece support system for moving the workpiece; a beam-positioning system for directing the beam axis toward the workpiece, such that a laser pulse is operable to mark a spot on the substrate; and a controller for coordinating relative movement of the workpiece support system and the beam-positioning system, and for implementing conversion of designated geometrically-shaped areas of the two-dimensional code into respective locations on the substrate for spots of the groups representative of the designated geometrically-shaped areas.

In some alternative, additional, or cumulative embodiments, a method for reading a two-dimensional identification code within a substrate having first and second opposing surfaces comprises: directing light toward a first surface of the substrate, wherein the light has a wavelength, and wherein the substrate is transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein a first portion of the light is blocked by the spots, and wherein a second portion of the light passes beyond the spots and propagates through the second surface of the substrate; magnifying the second portion the light that propagates through the second surface of the substrate; imaging with an imager the second portion the light that propagates through the second surface of the substrate and is magnified; analyzing an image of the second portion of the light and shadows caused by blockage of the first portion of the light to determine the distribution of the spots; and determining the two-dimensional code based on the distribution of the spots imaged by the imager.

In some alternative, additional, or cumulative embodiments, a method for reading a two-dimensional identification code within a substrate having first and second opposing surfaces, comprising: directing light toward the first surface of the substrate, wherein the light has a wavelength, and wherein the substrate and its first surface are transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein a first portion of the light passes beyond the spots and is absorbed at the second surface, wherein the second surface or a coating applied thereon is absorptive to the wavelength, and wherein a second portion of the light passes beyond the spots and propagates through the second surface of the substrate through the first surface; magnifying the second portion of the light that propagates through the first surface; imaging with an imager the second portion of the light that propagates through the first surface and is magnified; analyzing an image of the second portion of the light and a dark background caused by absorption of the first portion of the light to determine the distribution of the spots; and determining the two-dimensional code based on the distribution of the spots imaged by the imager.

In some alternative, additional, or cumulative embodiments, a method for reading a two-dimensional identification code within a substrate having first and second opposing surfaces, comprising: directing light toward the first surface of the substrate, wherein the light has a wavelength, and wherein the substrate and its first surface are transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein some of the light passes beyond the spots and becomes reflected light by the second surface, wherein the second surface or a coating applied thereon is reflective to the wavelength, wherein a first portion of the reflected light is blocked by the spots, and wherein a second portion of the reflected light passes beyond the spots and propagates through the first surface of the substrate; magnifying the second portion of the reflected light that propagates through the first surface; imaging with an imager the second portion the reflected light that propagates through the second surface of the substrate and is magnified; analyzing an image of the second portion of the reflected light and shadows caused by blockage of the first portion of the reflected light to determine the distribution of the spots; and determining the two-dimensional code based on the distribution of the spots imaged by the imager.

In some alternative, additional, or cumulative embodiments, the representative geometric shape is a rectangular geometric shape, and the first and second groups of spots are positioned to represent corners of the rectangular geometric shape.

In some alternative, additional, or cumulative embodiments, the first and second groups of spots each contain an even number of spots.

In some alternative, additional, or cumulative embodiments, the first and second groups of spots each contain an odd number of spots.

In some alternative, additional, or cumulative embodiments, the distribution of spots representing the two-dimensional code is invisible to a human eye at a distance of greater than or equal to 25 mm from the human eye.

In some alternative, additional, or cumulative embodiments, the array has an array dimension that is larger than 50 microns.

In some alternative, additional, or cumulative embodiments, the array has an array dimension that is larger than 500 microns.

In some alternative, additional, or cumulative embodiments, the array has an array dimension that is smaller than 500 microns.

In some alternative, additional, or cumulative embodiments, the array has an array dimension that is smaller than 250 microns.

In some alternative, additional, or cumulative embodiments, the array has an array dimension that is smaller than or equal to 1 mm.

In some alternative, additional, or cumulative embodiments, the groups of spots are invisible to the human eye at a distance of greater than or equal to 25 mm from the human eye.

In some alternative, additional, or cumulative embodiments, each spot is invisible to the human eye at a distance of greater than or equal to 25 mm from the human eye.

In some alternative, additional, or cumulative embodiments, each spot has a dimension for a major spatial axis that is smaller than 35 microns.

In some alternative, additional, or cumulative embodiments, each spot has a spot dimension for a major spatial axis, and wherein a distance that is greater than or equal to four times the spot dimension of the major spatial axis separates the spots.

In some alternative, additional, or cumulative embodiments, the geometric areas represent squares in a QR code.

In some alternative, additional, or cumulative embodiments, the geometric areas represent squares in a GS1 DataMatrix code.

In some alternative, additional, or cumulative embodiments, each spot is formed by a laser pulse or by a group of laser pulses.

In some alternative, additional, or cumulative embodiments, each spot is formed by a laser pulse or a group of laser pulses each laser pulse having a pulsewidth that is shorter than or equal to 50 ps.

In some alternative, additional, or cumulative embodiments, the spots are dark and the substrate is light.

In some alternative, additional, or cumulative embodiments, the spots make light marks and the substrate is dark.

In some alternative, additional, or cumulative embodiments, the spots are dark, and wherein the substrate is substantially transparent to visible light.

In some alternative, additional, or cumulative embodiments, the substrate is opaque to visible light.

In some alternative, additional, or cumulative embodiments, the substrate comprises a crystalline material.

In some alternative, additional, or cumulative embodiments, the substrate comprises sapphire.

In some alternative, additional, or cumulative embodiments, the substrate comprises a noncrystalline material.

In some alternative, additional, or cumulative embodiments, the substrate comprises glass.

In some alternative, additional, or cumulative embodiments, the substrate comprises a plastic.

In some alternative, additional, or cumulative embodiments, the substrate comprises aluminum.

In some alternative, additional, or cumulative embodiments, the laser pulses are directed to sequentially form a first group of spots before forming a second group of spots.

In some alternative, additional, or cumulative embodiments, the laser pulses are directed to form a first spot in each of first and second groups before forming a second spot in the first group.

In some alternative, additional, or cumulative embodiments, a beam-positioning system and a workpiece support system cooperate to position the spots of the laser pulses with respect to locations on the substrate, and wherein positioning accuracy of the spots to location is worse than 10 microns.

In some alternative, additional, or cumulative embodiments, wherein a beam-positioning system and a substrate support system cooperate to position the spots of the laser pulses with respect to locations on the substrate, and wherein positioning accuracy of the spots to location is worse than 5 microns.

In some alternative, additional, or cumulative embodiments, wherein a beam-positioning system and a substrate support system cooperate to position the spots of the laser pulses with respect to locations on the substrate, and wherein positioning accuracy of the spots to location is worse than 1 micron.

In some alternative, additional, or cumulative embodiments, the group of spots provides a signal-to-noise ratio of greater than or equal to 5.

In some alternative, additional, or cumulative embodiments, the pitch or external separation between groups of spots can represent the signal amplitude, and the uncertainty or maximum inaccuracy of the coordinated beam positioning and workpiece support systems can represent the noise.

In some alternative, additional, or cumulative embodiments, the pitch or external separation between the groups of spots is increased to increase the signal-to-noise ratio.

In some alternative, additional, or cumulative embodiments, a controller is employed to convert black squares of the two-dimensional code into respective locations on the substrate for the groups of spots.

In some alternative, additional, or cumulative embodiments, a controller is employed to convert black squares of the two-dimensional code into respective locations on the substrate for the groups of spots.

In some alternative, additional, or cumulative embodiments, the array comprises at least 50 geometric areas in a row or a column.

In some alternative, additional, or cumulative embodiments, the two-dimensional identification code is intended to be machine-readable.

In some alternative, additional, or cumulative embodiments, the light source is positioned to propagate the light along an illumination path that traverses the first surface, wherein the imager and the optical system are positioned along an imaging path operable to receive the light emitted from the second surface.

In some alternative, additional, or cumulative embodiments, the first electronic circuitry analyzes shadows caused by blockage of the light by the spots.

In some alternative, additional, or cumulative embodiments, the light source is positioned to propagate the light along an illumination path that traverses the first surface, wherein the imager and optical system are positioned along an imaging path that transverses the first surface and are operable to receive the light propagating through the first surface.

In some alternative, additional, or cumulative embodiments, the spots are at least partly reflective to the light, wherein the second surface or a layer thereon is at least partly absorptive to the light, and wherein first electronic circuitry analyzes the light reflected from the spots.

In some alternative, additional, or cumulative embodiments, the spots are at least partly absorptive to the light, wherein the second surface or a layer thereon is at least partly reflective to the light, and wherein the first electronic circuitry analyzes shadows caused by blockage of the light by the spots.

In some alternative, additional, or cumulative embodiments, the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, and wherein some of the geometric areas include one group of spots and some of the geometric areas are devoid of spots.

In some alternative, additional, or cumulative embodiments, the illumination path traverses the first surface at a perpendicular angle.

In some alternative, additional, or cumulative embodiments, the light source is positioned along an illumination axis that is generally perpendicular to the first surface of the substrate.

In some alternative, additional, or cumulative embodiments, the imager is positioned along the illumination axis.

In some alternative, additional, or cumulative embodiments, the light source is positioned along an illumination axis that has a non-perpendicular angle of incidence to the first surface of the substrate.

In some alternative, additional, or cumulative embodiments, the illumination axis has an angle of incidence of between 1 and 70 degrees.

In some alternative, additional, or cumulative embodiments, the illumination axis has an angle of incidence of between 10 and 65 degrees.

In some alternative, additional, or cumulative embodiments, the illumination axis has an angle of incidence that is less than or equal to 60 degrees.

In some alternative, additional, or cumulative embodiments, the imager is positioned along an imaging axis that is perpendicular to the first surface.

In some alternative, additional, or cumulative embodiments, the light source comprises an LED.

In some alternative, additional, or cumulative embodiments, the light source provides a visible wavelength.

In some alternative, additional, or cumulative embodiments, the light source provides one or more of the following wavelengths: 660 nm, 635, nm, 633 nm, 623 nm, 612 nm, 592, nm, 585 nm, 574 nm, 570 nm, 565, nm, 560 nm, 555 nm, 525 nm, 505, nm, 470 nm, and 430 nm.

In some alternative, additional, or cumulative embodiments, the light source provides a red wavelength.

In some alternative, additional, or cumulative embodiments, the imager is monochromatic.

In some alternative, additional, or cumulative embodiments, the imager is full color.

In some alternative, additional, or cumulative embodiments, the optical system employs optics that provide from two through fifty times magnification.

In some alternative, additional, or cumulative embodiments, the optical system employs optics that provide greater than five times magnification.

In some alternative, additional, or cumulative embodiments, the optical system employs optics that provide greater than ten times magnification.

In some alternative, additional, or cumulative embodiments, the optical system employs optics that provide less than twenty times magnification.

In some alternative, additional, or cumulative embodiments, the optical code reader has a modulation transfer function of greater than 50 line pairs/millimeter.

In some alternative, additional, or cumulative embodiments, the optical code reader has a modulation transfer function of greater than 75 line pairs/millimeter.

In some alternative, additional, or cumulative embodiments, the optical code reader has a modulation transfer function of greater than 80 line pairs/millimeter.

In some alternative, additional, or cumulative embodiments, the optical code reader has a modulation transfer function of greater than 90 line pairs/millimeter.

In some alternative, additional, or cumulative embodiments, the optical system provides a depth of field of about +/−50 µm.

In some alternative, additional, or cumulative embodiments, the optical system provides a depth of field of about +/−10 µm.

In some alternative, additional, or cumulative embodiments, the optical system provides a depth of field of about +/−2.5 µm.

In some alternative, additional, or cumulative embodiments, the optical system provides a field of view that is greater than or equal to about 500 µm.

In some alternative, additional, or cumulative embodiments, the optical system provides a field of view that is greater than or equal to about 800 µm.

In some alternative, additional, or cumulative embodiments, the optical system provides a field of view that is smaller than or equal to about 800 µm.

In some alternative, additional, or cumulative embodiments, the spots form a DM or 2DID code having a field size with a side dimension smaller than 500 microns.

In some alternative, additional, or cumulative embodiments, the spots form a DM or 2DID code having a field size with a side dimension smaller than 250 microns.

In some alternative, additional, or cumulative embodiments, the spots form a DM or 2DID code having a field size with a side dimension smaller than 125 microns.

In some alternative, additional, or cumulative embodiments, the spots form a DM or 2DID code having a field size with two dimensions smaller than 250 microns.

In some alternative, additional, or cumulative embodiments, the spots form a DM or 2DID code having a field size with two dimensions smaller than 125 microns.

Additional aspects and advantages will be apparent from the following detailed description of preferred embodiments, which proceeds with reference to the accompanying drawings.

DETAILED DESCRIPTION OF EXEMPLARY EMBODIMENTS

Figure 1:
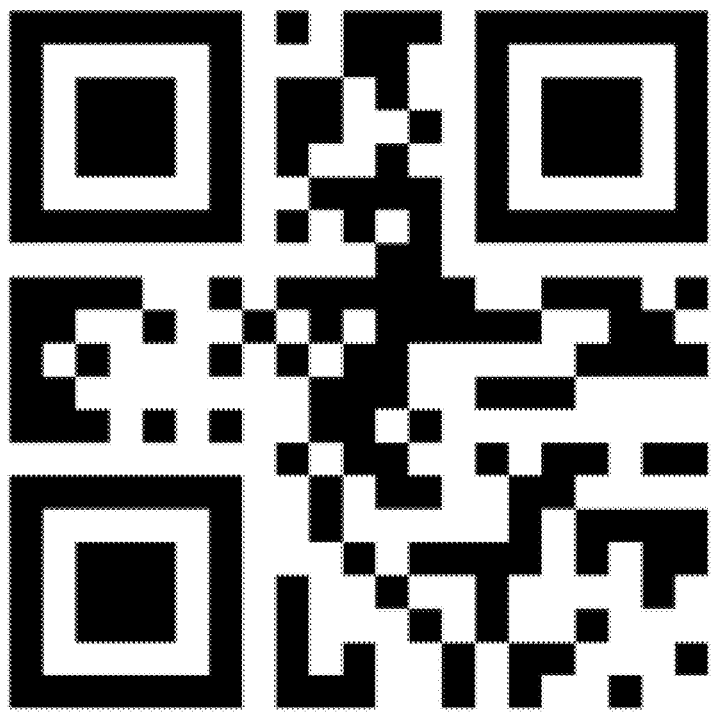
FIG. 1 is an example of a conventional QR code.

Example embodiments are described below with reference to the accompanying drawings. Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

Some 2DID codes have been marked inside glass, such as by using TRACKinside® technology (see http://www.totalbrandsecurity.com/?page_id=209#&panel1-1). A number of laser micromachining systems manufactured by Electro Scientific Industries, Inc. of Portland, Oreg., USA, such as models MM5330 and MM5900, equipped with appropriate lasers operated at various parameter combinations are also suitable for making 2DID codes on or within a variety of materials, such as ceramics, glasses, metals, or combinations thereof.

As marking on smaller parts has become desirable, the sizes of the 2DID codes have become smaller. Moreover, the availability of "invisible" DM or 2DID codes would be useful for some applications, such as for transparent materials that serve as screens through which unobstructed views are desirable, or such as for proprietary information or secretive manufacturer labeling that could be used for a variety of purposes such as to detect authentic products versus counterfeit products.

One method for making a DM or 2DID code invisible is to shrink the size of the code until the whole array of black squares is too small to see with the human eye. The theoretical maximum angular resolution of the human eye is 1.2 arc minutes, corresponding to a spot size of d=0.35 mm (350 microns) at a distance of 1.0 meter and d=0.7 mm at a distance of 2.0 meters. For convenience, this maximum angular resolution can be expressed as: $d \leq 0.35x$ mm, where d is the spot size in millimeters and x is the distance from the eye to the spot in meters.

However, at closer distances, such as a typical distance for reading a mobile phone screen (about 25 cm), the DM or 2DID code would have to be smaller to be invisible (about 87.5 microns), and the individual squares would have to be even smaller. Even though a laser could be employed to make the individual squares adequately small, the black squares would most likely be sized to equal the spot size a single laser pulse. For example, a conventionally small laser spot size such as about 5 microns would limit such an invisible DM or 2DID code to include at most 17 squares in a row or column. The practical limit of smallness of laser spot size is generally accepted to be about two times the wavelength of the laser employed, so spot sizes less than about 1 or 2 microns can be difficult and expensive to employ. Accordingly, there are significant cost and technological limits to more significant DM or 2DID code shrinkage.

Figure 3:
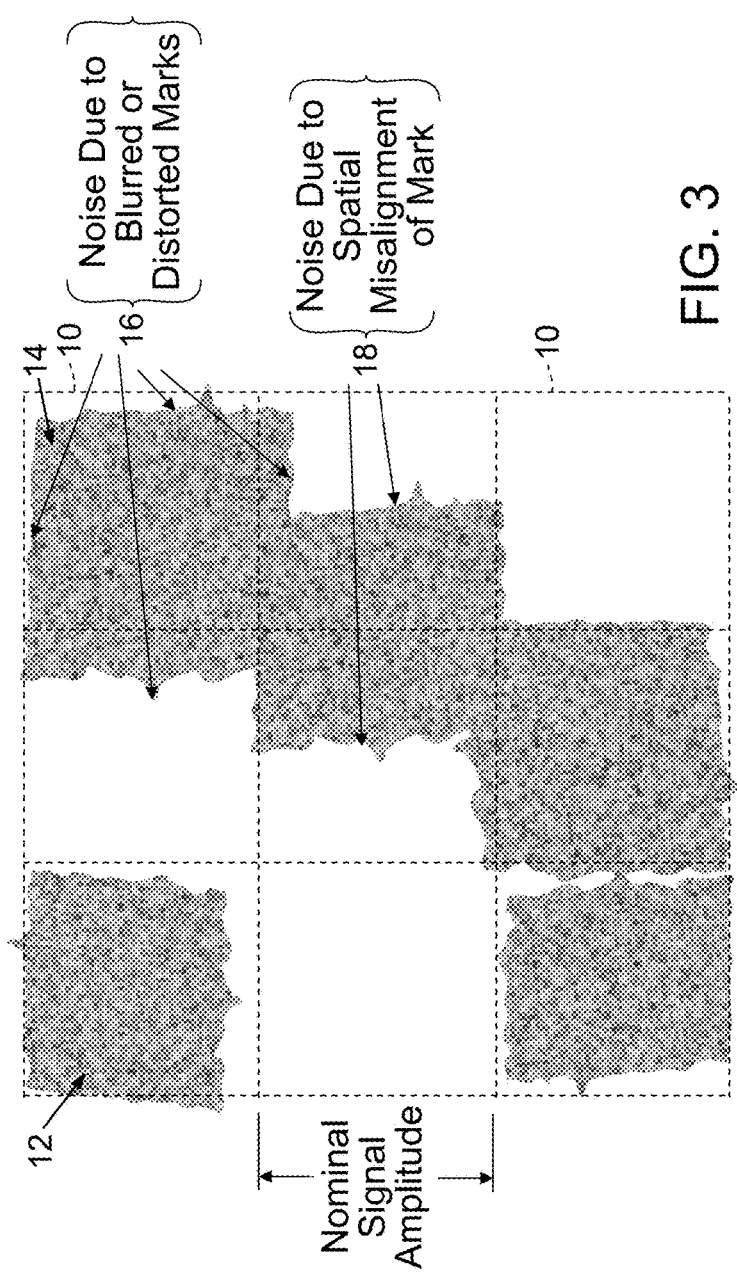
FIG. 3 shows laser-made small "black squares" of a portion of a 2DID code superimposed on a square grid.

FIG. 3 shows simulated laser-made "black squares" of a portion of a DM or 2DID code superimposed on a square grid pattern 10. Actual lasers and materials may cause laser marking in blurred, distorted shapes, that are not properly aligned and that are not completely black, but rather shades of grey. All of these factors (blurring, shape distortion, misalignment, and low-contrast shading) result in less certainty regarding whether a particular square should be classified as "black" or "white." Some of these factors may result from unpredictable laser cavity effects, transient or chronic misalignment of optical components, or transient or chronic incoordination of beam positioning components and laser timing. These uncertainties are collectively referred to as the "noise."

These laser-made black squares and the grid pattern shown in FIG. 3 reveal how these issues may increase the noise with shrinkage of a 2DID code. In particular, FIG. 3 shows a shrunken mark 12, an enlarged mark 14, and non-uniform edges 16 caused by system noise. FIG. 3 also shows a misaligned mark 18 that may be caused by position inaccuracies or coordination inaccuracies in beam positioning or substrate positioning systems or timing inaccuracies with these systems and laser pulse generation. These distorted marks, particularly marks 14 and 18, may create difficulty for optical code readers to interpret even with the most sophisticated optics and error correction software.

The signal-to-noise ratio (SNR) of the marked DM or 2DID code determines the likelihood of whether the code will be sufficiently undistorted to minimize errors in reading the 2DID code. The size of the individual squares in the 2DID code is proportional to the signal strength while distortion of the shape and size of the individual squares is proportional to the noise. Moreover, the signal amplitude can be determined by the spatial separation between patterns of spots representing each square and the noise amplitude can be determined by the accuracy of the system used to mark the spots. Therefore, as the size of the individual squares gets smaller, the signal strength is lower and the code is more susceptible to distortions, such as blurring or line distortion, that may occur in less-than-perfect marking machines.

Figure 6:
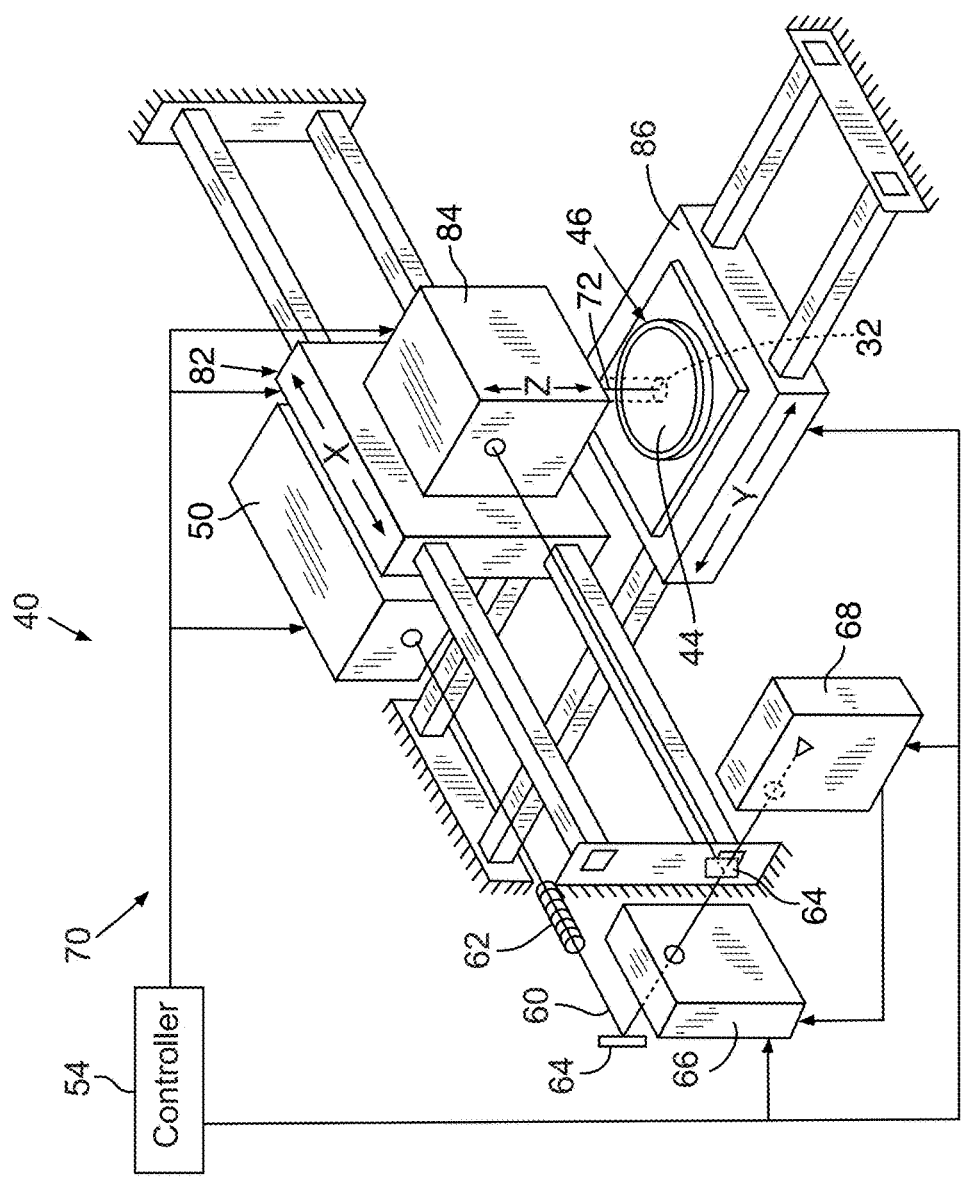
FIG. 6 is simplified and partly schematic perspective view of some components of an exemplary laser micromachining system suitable for producing the spot of a modified 2DID code.

Nevertheless, Electro Scientific Industries, Inc. of Portland, Oreg. made a laser micromachining system to successfully overcome many of these issues by precisely controlling alignment, timing, and coordination of the system components and by limiting the processing window of the laser system parameters to precisely deliver laser spots smaller than 10 microns to desired locations on a workpiece 46 (FIG. 6). In one particular embodiment, a microscopic 2DID code of a 126 by 126 micron-array of squares was made, wherein each designated black square was represented by a 4-5 micron-spot. However, the laser micromachining system used to make this 2DID code was very large and employed very expensive components.

To reduce system cost for producing invisible DM or 2DID codes with a laser, applicant pursued a completely different paradigm. Rather than contend with the costs and problems associated with shrinking an entire 2DID code to be small enough to be invisible to the human eye, applicant determined that the 2DID code can be represented by a modified 2DID code that includes a group of spots that are invisible to the human eye for each black square of the 2DID code.

Figure 4:
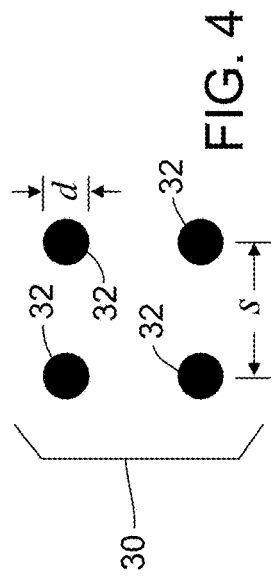
FIG. 4 is an enlarged representation of an exemplary pattern of laser spots used to replace a filled darkened square of a 2DID code.

FIG. 4 is an enlarged presentation of an exemplary pattern or group 30 of laser marks or spots 32 used to replace a filled darkened square of a conventional 2DID code. As noted earlier, the maximum angular resolution of the human eye can be expressed for convenience, as d≤0.35x mm, where d is a major axis of the laser spot in millimeters and x is the distance from the eye to the spot in meters. So, for a typical minimum reading distance of about 125 cm, each spot in the 2DID code would have to have a major axis with a spot dimension that is shorter than or equal to about 44 microns to be invisible to the human eye (yet visible when magnified, such as under microscopic viewing).

During experimentation with grouping patterns, applicant noted that when invisibly small spots 32 are grouped closely together, they may appear as a single spot of a larger size, thus causing the group 30 of spots 32 to become visible. Empirical data based on experimentation demonstrated, however, that circularly shaped spots 32 with a diameter d appear as individual spots (as opposed to a conglomeration of spots appearing as a single spot) when the center-to-center separation of the spots 32, s, is greater than four times the diameter (i.e., s≥4d), as shown in FIG. 4.

Simple software can be used to convert a conventional 2DID code into a modified form, wherein each black square (or each data point) is represented by a pattern of small spots 32 (subdata points), wherein each individual spot 32 is selected to have a major spatial axis d that is small enough to be invisible to the human eye and the center-to-center spacing or distance between any two spots 32 is greater than four times the largest cross sectional dimension (e.g., the major spatial axis d) of the individual spots 32. Thus, the shape of each spot 32, as well as the size of the spot 32, can be selected. Circular spots 32 are typically easiest to produce, but square or elliptical spots 32, for example can also be employed. Similarly, the spatial energy profile to form each spot 32 need not be uniform.

In general, the major spatial axis d of each spot 32 is between about 0.5 micron and about 90 microns. (A major spatial axis d smaller than about 87.5 microns is invisible to the human eye at a distance of 25 cm.) In some embodiments, the major spatial axis d of the spot 32 is between about 1 micron and about 75 microns, or the major spatial axis d of the spot 32 is shorter than 75 microns. In some embodiments, the major spatial axis d of the spot 32 is between about 1 micron and about 50 microns, or the major spatial axis d of the spot 32 is shorter than 50 microns. (A major spatial axis d smaller than about 43.75 microns is invisible to the human eye at a distance of 12.5 cm.) In some embodiments, the major spatial axis d of the spot 32 is between about 1 micron and about 25 microns, or the major spatial axis d of the spot 32 is shorter than 25 microns. (A major spatial axis d smaller than about 22 microns is invisible to the human eye at a distance of 6.25 cm. Generally, a spot size of about 30 microns or less will be invisible to most human eyes at any distance due to the anatomical constraints of the human eye and the optical constraints of conventional eyewear.) In some embodiments, the major spatial axis d of the spot 32 is between about 1 micron and about 10 microns, or the major spatial axis d of the spot 32 is shorter than 10 microns. In some embodiments, the major spatial axis d of the spot 32 is between about 1.5 micron and about 5 microns, or the major spatial axis d of the spot 32 is shorter than 5 microns.

In general, it is advantageous to make the major spatial axis d of the spot 32 to be as small as practical (and at least small enough so as to not adversely affect the substrate to be marked) without significantly increasing the cost of the laser micromachining system or significantly increasing the cost of the optical code reader. It will be appreciated that the smaller that the major spatial axis d of the spot 32 is made, the smaller can be the minimum spot separation distance s can be made without the group 30 of spots 32 becoming visible (and the smaller size of the overall 2DID code can be made). However, it will also be appreciated that there may be advantages for spacing the spots 32 at separation distances that are significantly greater than the minimum separation distance s to increase the signal-to-noise ratio even when the major spatial axis d of the spots 32 is minimized.

For simplicity, each spot 32 can be similar in shape and size, and form with a similar spatial energy profile; however, these characteristics can be intentionally changed for particular spots 32 if desirable. Moreover, unintentional differences in the characteristics between different spots 32 do not cause optical reading errors because of the advantageous signal-to-noise ratio.

In some embodiments, based on a spot size of about 1 micron and applicant's empirical data, the minimum separation distance s is greater than or equal to 4 microns. In an exemplary array for a 177 by 177 DM or 2DID code to be marked in a 1 mm by 1 mm field, the separation distance s between 1-micron spots 32 could be as much as about 5.6 microns. Of course, the field for the modified 2DID codes need not be this small, so the largest separation distance s can be determined by the size of the substrate divided by the number of geometric areas in a row or column of the 2DID code. For example, a 10 cm by 10 cm field for a 177 by 177 2DID code could offer as much as a 565 micron-separation distance s between 1-micron spots 32; a 20 cm by 20 cm field for a 57 by 57 2DID code could offer as much as about a 3500 micron-separation distance s between 1-micron spots 32; or a 1 mm by 1 mm field for a 21 by 21 2DID code could offer as much as about a 40 micron-separation distance s between 25-micron spots 32. As noted earlier, larger separation distances s provide larger signal-to-noise ratios. Moreover, properties of the laser micromachining system may influence selection of the separation distance s between spots 32. For example, if a laser micromachining system has a spot location position accuracy of about plus or minus 20 microns, then a separation distance s of at 40 microns may be advantageous.

A group area may be defined by spots 32 that form the perimeter of the distribution of spots in the group 30. Each spot 32 in the group 30 has a spot size or spot area as previously discussed. A cumulative spot area can represent the sum of the spot areas of the spots 32 within one group 30. In some embodiments, the cumulative spot area is smaller than or equal to less than 10% of the group area. In some embodiments, the cumulative spot area is smaller than or equal to less than 5% of the group area. In some embodiments, the cumulative spot area is smaller than or equal to less than 1% of the group area. In some embodiments, the cumulative spot area is smaller than or equal to less than 0.5% of the group area. In some embodiments, the cumulative spot area is smaller than or equal to less than 0.1% of the group area.

Figure 2:
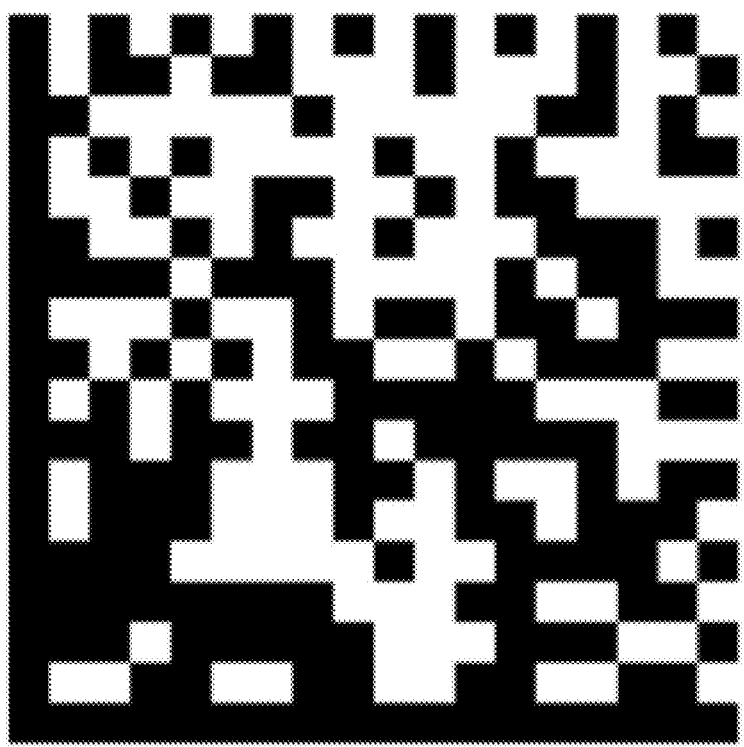
FIG. 2 is an example of a conventional GS1 DataMatrix code.
Figure 5:
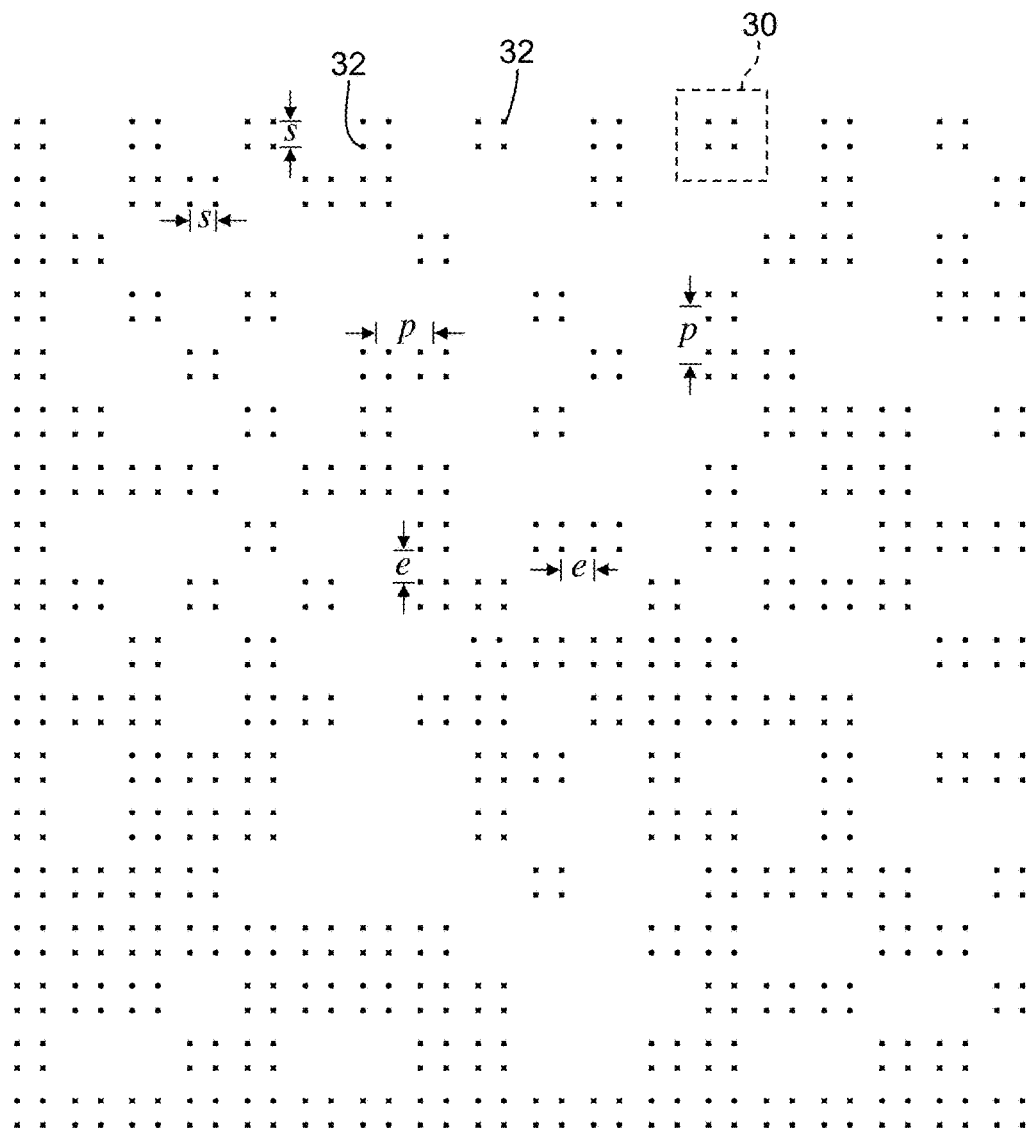
FIG. 5 is a modified version of the GS1 DataMatrix code of FIG. 2, wherein each filled darkened square is replaced with the pattern of spots of FIG. 4.

FIG. 5 is a modified version of the GS1 DataMatrix code of FIG. 2, wherein each black (designated) square in the array is replaced with the pattern of spots 32 of FIG. 4. The group 30 of spots 32 is shown having four spots 32 arranged in a pattern such that each spot 32 is positioned in proximity to or at a corner of a designated square.

The field size for the modified DM or 2DID code array is limited only by the size of the substrate 44 on the workpiece 46 to be marked (FIG. 6). In many embodiments, the field will be smaller than 20 cm by 20 cm and larger than 50 microns by 50 microns. In some embodiments, the field will be smaller than or equal to 500 microns by 500 microns (and greater than 1 micron by 1 micron). In some embodiments, the field will be smaller than or equal to 250 microns by 250 microns (and greater than 1 micron by 1 micron). In some embodiments, the field will be smaller than or equal to 100 microns by 100 microns (and greater than 1 micron by 1 micron).

In some embodiments, the size of the modified 2DID code will be greater than or equal to 600 microns by 600 microns. In some embodiments, the size of the modified 2DID code will be smaller than or equal to 1 mm by 1 mm. In some embodiments, the size of the modified 2DID code will be larger than or equal to 1 mm by 1 mm and smaller than or equal to 10 mm by 10 mm. In some embodiments, the size of the modified 2DID code will be larger than or equal to 1 cm by 1 cm and smaller than or equal to 10 cm by 10 cm. As previously mentioned, properties of the selected laser micromachining may influence spot size and limit positioning field. Properties of the substrate 44 may also influence field size of the array because there may be structural integrity or advantages for maximizing the separation distance s in some materials. Additionally, size and cost of optical code readers and their capabilities, and throughput of code detection may also be factors in determining an appropriate filed size for the 2DID code array. Finally, the purpose of the modified 2DID code may influence the field size selected for its array.

It will be appreciated, that the geometric areas in the array need not be square. For example, they may be triangular or hexagonal. Moreover, the number of spots 32, and the pattern of spots 32, in a group 30 representing each geometric area can be somewhat arbitrary or can be particularly selected. For example, five spots can represent each designated geometric area, such a square, wherein four spots 32 are positioned at the corners and one spot 32 is positioned in the middle. Thus, each designated geometric area can be represented by an even number of spots or by an odd number of spots. In such embodiment, four of the spots 32 are separated from the middle spot 32 by the selected distance s, because it is the shortest distance between any two spots 32 in the group 30. The corner (or perimeter) spots are, therefore, separated by a distance greater than s. Thus, the spots 32 (or nearest neighboring spots 32) in a group 30 can be separated by unequal distances.

As noted previously, the designated geometric areas in the array need not be represented by a geometric pattern that is analogous to the geometric area. For example, a designated square geometric area can be represented by other geometric patterns, including but not limited to, rectangular patterns, circular patterns, hexagonal patterns, octagonal patterns, or triangular patterns. For convenience and simplicity, each designated geometric area may be provided with the same geometric pattern of spots 32. However, selected designated geometric areas may be labeled with a different number of spots 32, a different size of the pattern of spots 32, or a different pattern of spots. For example, position squares and/or alignment squares of a QR code may be represented by different patterns or by patterns of different sizes.

Figure 5A:
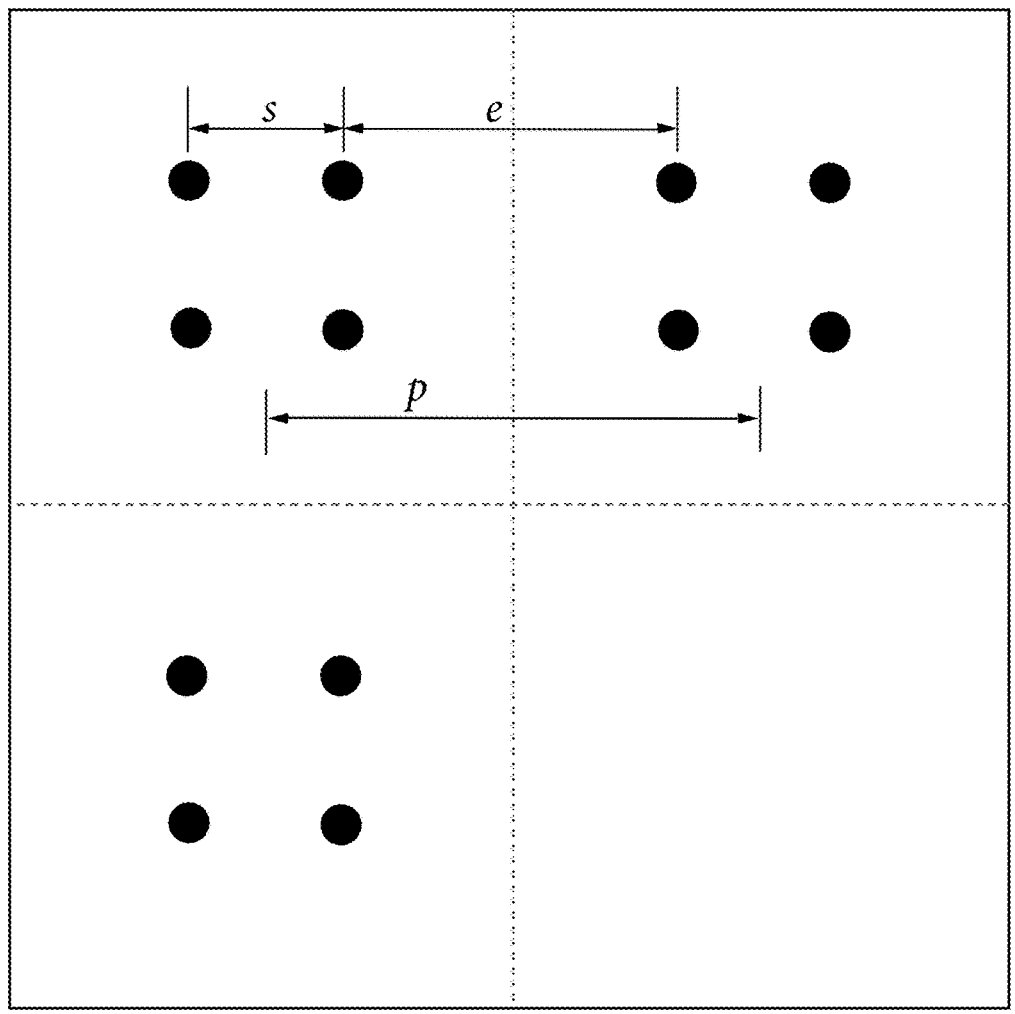
FIG. 5A is an enlarged portion of FIG. 5 to facilitate differentiation between the internal separation distance, the external separation distance, and the pitch.

With reference to FIG. 3, there is no intentional separation between adjacent marked squares, and the pitch between the marked squares has the same dimension as the sides of the marked squares. Thus, in the embodiment shown in FIG. 3, the noise can be comparable to the signal. However, with reference again to FIG. 5, in many embodiments, neighboring groups 30 of spots 32 can be separated by an external separation distance e (the minimum separation distance between adjacent spots from different groups) and a pitch p (the center-to-center spacing between adjacent geometric areas or their representative groups. FIG. 5A is an enlarged portion of FIG. 5 to facilitate differentiation between the internal separation distance s, the external separation distance e, and the pitch p.

In many embodiments, the pitch p will be different from and greater than the external separation distance e, and both the pitch p and the external separation distance e will be different from and generally greater than the selected minimum separation distance s between spots 32 in a group 30.

Moreover, in some embodiments, the external separation distance e between the rows or columns in the array can be greater than or equal to 1 s to maintain a desirable signal-to-noise ratio. One will appreciate that the external separation distance e between the rows can be different from the external separation distance e between the columns. It will also be appreciated that the external separation distance e between rows and columns may diminish the separation distances s by more than half for the earlier examples listing spot size, field size, and number of groups 30 in a row or column.

Similarly, in some embodiments, the pitch p between the rows or columns in the array can be greater than or equal to 1 s to maintain a desirable signal-to-noise ratio. One will also appreciate that the pitch p between the rows can be different from the pitch p between the columns. It will also be appreciated that the pitch p between rows and columns may diminish the separation distances s by more than half for the earlier examples listing spot size, field size, and number of groups 30 in a row or column.

Thus, the signal-to-noise ratio can also be improved by making the overall size of the geometric areas, such as squares, can be made much larger than the perimeter defined by the pattern of spots 32 (if the patterns are grouped near the center of the geometric areas).

In some embodiments, the signal amplitude can be represented by the external separation distance e or the pitch p. The noise amplitude can be represented by the uncertainty or inaccuracy of the spot position with respect to a specific location on the substrate 44. For example, if the laser micromachining system that is marking the spots has a marking inaccuracy of +/−20 microns, this inaccuracy would represent the noise. So, the signal-to-noise ratio would be the ratio of the external separation distance e or the pitch p to the marking inaccuracy. If the marking inaccuracy inherent into a laser system is permitted to be large or gets worse over time, the external separation distance e or the pitch p could be increased to maintain an adequate signal-to-noise ratio. Alternatively, if the inaccuracy is known to be a fixed number, the signal-to-noise ratio can be increased to an arbitrarily large number by increasing the external separation distance e or the pitch p.

In view of the foregoing, the signal-to-noise ratio can easily be established to be greater than 5, which, according to the Rose criterion, is the minimum signal-to-noise ratio needed to be able to distinguish image features at 100% certainty. It will be appreciated, however, that signal-to-noise ratio values of less than 5 can be employed. Moreover, the modified two-dimensional codes described herein can provide arbitrarily large signal-to-noise ratio values, such as greater than or equal to 10, greater than or equal to 100, or greater than or equal to 1000.

In some alternative embodiments, no spacing between the rows or columns in the array is used, such that the patterns in adjacent designated geometric areas may share spots 32. For example, two corner patterns of neighboring designated square geometric areas may share the two spots 32 along the border of the two square geometric areas. The optical code reader would have to be adapted to recognize, for example, that three pairs of evenly spaced spots 32 represented two designated squares.

Regardless of the size of the array, the separation distance s between the spots 32, external separation distance e (if any) or the pitch distance p between the rows and between the columns, the selected pattern for the groups 30, and the size and shape of the geometric areas, the spots 32 can be converted back into designated geometric areas (such as black squares).

As noted previously, advantages of modifying the 2DID codes as described herein include method for making the 2DID codes invisible to the human eye in a variety of substrate materials, either transparent materials or opaque materials. Exemplary materials include ceramics, glasses, plastics, and metals, or combinations thereof. Exemplary materials may be crystalline or noncrystalline. Exemplary materials may be natural or synthetic. For example, laser micromachining systems can make appropriately sized marks on or within semiconductor wafer materials, such alumina or sapphire. Laser micromachining systems can also make appropriately sized marks on or within glass, strengthened glass, and Corning Gorilla Glass™. Laser micromachining systems can also make appropriately sized marks on or within polycarbonates and acrylics. Laser micromachining systems can also make appropriately sized marks on or within aluminum, steel, and titanium.

Invisible marking of modified DM or 2DID codes not only provides a way to place codes without obscuring transparent materials, but also provides a way to hide proprietary information within the modified codes. For example, multiple patterns can be provided within a modified 2DID code, wherein only some of the patterns include the proprietary information. Additionally, the small and spread out spots 32 can be arranged to appear to be imperfections in the substrate material, so it might be difficult for a competitor or potential copier to even be aware that the modified 2DID code is present. Finally, the modified 2DID codes can be made to be more complex than standard 2DID codes, so the modified 2DID codes can be more difficult to identify and copy by a counterfeiter.

Regardless of making the 2DID codes invisible, the modified 2DID codes enable large improvements in the signal-to-noise ratio (SNR) over conventional 2DID codes by spreading of the modified code over an arbitrarily large area. Moreover, whether or not the spots 32 are invisible, the modified 2DID codes reduce error and reduce the cost and time (throughput) of error correction.

Another advantage of spreading the 2DID code over a large area enables the use of less-expensive and lower-precision laser marking systems while maintaining invisibility (if desired).

As previously noted, the spots 32 can be marked on or within the substrate material of the workpiece 46 (FIG. 6). For many applications, there may be advantages to marking the spots 32 internally. Invisible spots 32 are very small and may be more likely to wear, or easily be abraded off, some materials. Internal marks may, however, be less accessible to normal wear or abrasion. Internal marks also allow surfaces to retain their imperviousness with respect to dirt or fluids and may be less likely to compromise structural integrity or promote surface crack propagation or other surface defects.

In general, internal marking may include one or more of cracking, density modification, void creation, stress fields, or re-crystallizations of core material between surfaces of a substrate 44.

Exemplary laser pulse parameters which may be selected to improve the reliability and repeatability of laser marking of substrates 44 include laser type, wavelength, pulse duration, pulse repletion rate, number of pulses, pulse energy, pulse temporal shape, pulse spatial shape, and focal spot size and shape. Additional laser pulse parameters include specifying the location of the focal spot relative to the surface of the article and directing the relative motion of the laser pulses with respect to the article.

FIG. 6 is simplified and partly schematic perspective view of some components of an exemplary laser micromachining system 40 suitable for producing the spot of a modified 2DID code. With reference to FIG. 6, some exemplary laser processing systems operable for marking spots 32 on or beneath a surface 42 of substrate 44 of a workpiece 46 are the ESI MM5330 micromachining system, the ESI ML5900 micromachining system and the ESI 5955 micromachining system, all manufactured by Electro Scientific Industries, Inc., Portland, Oreg. 97229.

These systems typically employ a solid-state diode-pumped laser, which can be configured to emit wavelengths from about 266 nm (UV) to about 1320 nm (IR) at pulse repetition rates up to 5 MHz. However, these systems may be adapted by the substitution or addition of appropriate laser, laser optics, parts handling equipment, and control software to reliably and repeatably produce the selected spots 32 on or within substrates 44 as previously described. These modifications permit the laser processing system to direct laser pulses with the appropriate laser parameters to the desired locations on an appropriately positioned and held workpiece 46 at the desired rate and pitch between laser spots or pulses to create the desired spot 32 with desired color, contrast, and/or optical density.

In some embodiments, the laser micromachining system 40 employs a diode-pumped Nd:YVO$_4$ solid-state laser 50 operating at 1064 nm wavelength, such as a model Rapid manufactured by Lumera Laser GmbH, Kaiserslautern, Germany. This laser can be optionally frequency doubled using a solid-state harmonic frequency generator to reduce the wavelength to 532 nm thereby creating visible (green) laser pulses, or frequency tripled to about 355 nm or frequency quadrupled to about 266 nm thereby creating ultraviolet (UV) laser pulses. This laser 50 is rated to produce 6 Watts of continuous power and has a maximum pulse repetition rate of 1000 KHz. This laser 50 produces laser pulses 52 (FIG. 7) with duration of 1 picosecond to 1,000 nanoseconds in cooperation with controller 54.

In some embodiments, the laser micromachining system 40 employs a diode-pumped erbium-doped fiber laser with a fundamental wavelength within the range of about 1030-1550 nm. These lasers can be optionally frequency doubled using a solid-state harmonic frequency generator to reduce the wavelength to about 515 nm thereby creating visible (green) laser pulses or to about 775 nm thereby creating visible (dark red) laser pulses, for example, or frequency tripled to about 343 nm or about 517 nm, or frequency quadrupled to about 257 nm or about 387.5 nm thereby creating ultraviolet (UV) laser pulses.

These laser pulses 52 may be Gaussian or specially shaped or tailored by the laser optics 62, typically comprising one or more optical components positioned along an optical path 60, to permit desired characteristics of the spots 32. For example, a "top hat" spatial profile may be used which delivers a laser pulse 12 having an even dose of radiation over the entire spot 32 that impinges the substrate 44. Specially shaped spatial profiles such as this may be created using diffractive optical elements or other beam-shaping components. A detailed description of modifying the spatial irradiance profile of laser spots 32 can be found in U.S. Pat. No. 6,433,301 of Corey Dunsky et al., which is assigned to the assignee of this application, and which is incorporated herein by reference.

The laser pulses 52 are propagated along an optical path 60 that may also include fold mirrors 64, attenuators or pulse pickers (such as acousto-optic or electro-optic devices) 66, and feedback sensors (such as for energy, timing, or position) 68.

The laser optics 62 and other components along the optical path 60, in cooperation with a laser beam-positioning system 70 directed by the controller 54, direct a beam axis 72 of the laser pulse 52 propagating along the optical path 60 to form a laser focal spot 80 in proximity to the surface 42 of the substrate 44 at a laser spot position. The laser beam-positioning system 70 may include a laser stage 82 that is operable to move the laser 50 along an axis of travel, such as the X-axis, and a fast-positioner stage 84 to move a fast positioner (not shown) along an axis of travel, such as the Z-axis. A typical fast positioner employs a pair of galvanometer-controlled mirrors capable of quickly changing the direction of the beam axis 72 over a large field on the substrate 44. Such field is typically smaller than the field of movement provided by the workpiece stage 86, as later described. An acousto-optic device or a deformable mirror may also be used as the fast positioner, even though these devices tend to have smaller beam deflection ranges than galvanometer mirrors. Alternatively, an acousto-optic device or a deformable mirror may be used as a high-speed positioning device in addition to galvanometer mirrors.

Additionally, the workpiece 46 may be supported by a workpiece stage 86 having motion control elements operable to position the substrate 44 with respect to the beam axis 72. The workpiece stage 86 may be operable to travel along a single axis, such as the Y-axis, or the workpiece stage 86 may be operable to travel along transverse axes, such as the X- and Y-axes. Alternatively, the workpiece stage 86 may be operable to rotate the workpiece 46, such as about a Z-axis (solely, or as well as move the workpiece 46 along the X- and Y-axes).

The controller 54 can coordinate operation of the laser beam-positioning system 70 and the workpiece stage 86 to provide compound beam-positioning capability, which facilitates the capability to mark spots 32 on or within the substrate 42 while the workpiece 46 can be in continuous relative motion to the beam axis 72. This capability is not necessary for marking the spots 32 on the substrate 42, but this capability may be desirable for increased throughput.

This capability is described in U.S. Pat. No. 5,751,585 of Donald R. Cutler et al., which is assigned to the assignee of this application, and which is incorporated herein by reference. Additional or alternative methods of beam positioning can be employed. Some additional or alternative methods of beam positioning are described in U.S. Pat. No. 6,706,999 of Spencer Barrett et al. and U.S. Pat. No. 7,019,891 of Jay Johnson, both of which are assigned to the assignee of this application, and which are incorporated herein by reference.

The various beam-positioning systems described herein can be controlled to offer beam-positioning accuracy of laser spot position within a few microns of the desired location of a spot 32 on the substrate 44. It is noted, however, that high accuracy may be implemented with higher cost components, greater feedback control, and slower system throughput. In general, beam-positioning error can be as large as one-half the separation distance s due to the significantly increased signal-to-noise ratio afforded by the modified DM or 2DID codes described herein. This allowable error can be quite large, such as a 1 mm for vary large fields. However, even very low-cost laser micromachining systems can achieve greater accuracy. Applicant has determined that for many embodiments, the error of laser spot position can be as much as plus or minus 20 microns of the desired location of a spot 32 on the substrate 44 even for relatively small fields. For many embodiments with very small fields, the error of laser spot position can be as much as plus or minus 10 microns of the desired location of a spot 32 on the substrate 44. However, for minimized field sizes, the error of laser spot position can be as much as plus or minus 1 micron of the desired location of a spot 32 on the substrate 44.

The cost for a +/−0.5 micron accuracy laser micromachining system used to produce a 126×126 micron demonstration can be well over a million dollars. The cost for a +/−20 micron accuracy laser micromachining system can be approximately one-tenth the cost of the more accurate machine (i.e., around $100,000). Moreover, the more accurate machines are much larger and require a carefully controlled temperature environment (and controlled vibration), whereas a +/−20 micron accuracy machine is significantly smaller and can work in a typical factory environment without special constraints.

Figure 7:
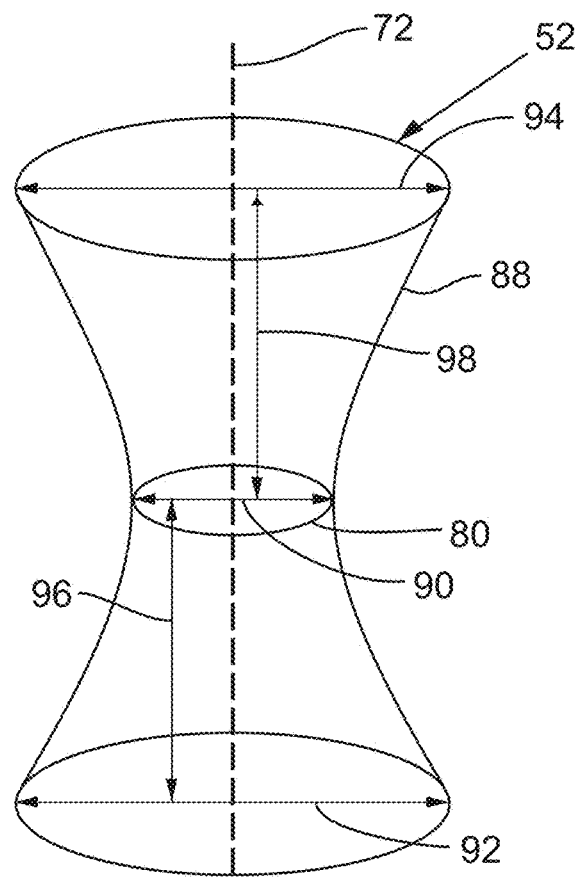
FIG. 7 shows a diagram of a laser pulse focal spot and its beam waist.

FIG. 7 shows a diagram of the focal spot 80 and its beam waist 90. With reference to FIG. 7, the focal spot 80 of the laser pulse 52 will have a beam waist 90 (cross-section) and laser energy distribution that are largely determined by the laser optics 62. The major spatial axis d of the spot 32 is typically a function of the major axis of the beam waist, and the two may be the same or similar. However, the major spatial axis d of the spot 32 may be larger than or smaller than the major axis of the beam waist.

The laser optics 62 can be used to control the depth of focus of the beam waist and hence the depth of the spot 32 on within the substrate 44. By controlling the depth of focus, the controller 54 can direct the laser optics 62 and the fast positioner Z-stage 84 to position the spot 32 either at or near the surface of the substrate 44 repeatably with high precision. Making marks by positioning the focal spot above or below the surface 42 of the substrate 44 allows the laser beam to defocus by a specified amount and thereby increase the area illuminated by the laser pulse and decrease the laser fluence at the surface 42 (to an amount that is less than the damage threshold of the material at the surface). Since the geometry of the beam waist is known, precisely positioning the focal spot 80 above or below or within the actual surface 42 of the substrate will provide additional precision control over the major spatial axis d and the fluence.

In some embodiments, such as for marking transparent materials such as sapphire, the laser fluence can be precisely controlled at the core of the substrate 44 by adjusting the location of the laser spot from being on the surface 42 of the substrate 44 to being located a precise distance within the substrate 44. With reference again to FIG. 7, the beam waist 90 is represented as a spatial energy distribution 88 of a laser pulse 52 along the beam axis 72 as measured by the FWHM method. The major axis 92 represents the laser pulse spot size on the surface 42 if the laser micromachining system 40 focuses the laser pulse 52 at a distance 96 above the surface 42. The major axis 94 represents the laser pulse spot size on the surface 42 if the laser processing system focuses the laser pulses at a distance 98 below the surface. For most embodiments where internal marking of the spots 32 is desirable, the focal spot 80 is directed to be positioned within the substrate 44 rather than above or below its surface 42. The fluence or irradiance may be employed at an amount that is lower than the ablation threshold of the substrate material except at the focal spot 80, at which the fluence or irradiance is concentrated to be above the ablation threshold of the substrate material.

In some embodiments, groups of laser pulses can be employed to create a single spot 32. In particular, laser parameters may be selected to cause each laser pulse to affect an area that is smaller than the desirable size for a spot 32. In such cases, a plurality of laser pulses may be directed at a single location until the spot 32 reaches a desirable size (which still may be undetectable by the human eye). The group of laser pulses can be delivered in relative motion or in substantially relative stationary positions.

Laser parameters that may be advantageously employed for some embodiments include using lasers 50 with wavelengths that range from IR through UV, or more particularly from about 10.6 microns down to about 266 nm. The laser 50 may operate at 2 W, being in the range of 1 W to 100 W, or more preferably 1 W to 12 W. Pulse durations range from 1 picosecond to 1000 ns, or more preferably from about 1 picosecond to 200 ns. The laser repetition rate may be in a range from 1 KHz to 100 MHz, or more preferably from 10 KHz to 1 MHz. Laser fluence may range from about $0.1 \times 10^{-6}$ J/cm$^2$ to 100.0 J/cm$^2$ or more particularly from $1.0 \times 10^{-2}$ J/cm$^2$ to 10.0 J/cm$^2$. The speed with which the beam axis 72 moves with respect to the substrate 44 being marked ranges from 1 mm/s to 10 m/s, or more preferably from 100 mm/s to 1 m/s. The pitch or spacing between adjacent rows of spots 32 on the substrate 44 may range from 1 micron to 1000 microns or more preferably from 10 microns to 100 microns. The major spatial axis d of the laser pulses 52 measured at the surface 42 of the substrate 44 may range from 10 microns to 1000 microns or from 50 microns to 500 microns. Of course, the major spatial axis d is preferably smaller than about 50 microns if the spot 32 is intended to be invisible. The elevation of the focal spot 80 of the laser pulses 52 with respect to the surface 42 of the substrate 44 may range from −10 mm to +10 mm or from −5 mm to +5 mm. In many embodiments for surface marking, the focal spot 80 is positioned at the surface 42 of the substrate 44. For many embodiments of internal marking, the focal spot 80 is positioned beneath the surface 42 of the substrate 44 (between the surfaces of the substrate 44). For some embodiments of internal marking, the focal spot 80 is positioned at least 10 microns beneath the surface 42 of the substrate 44. For some embodiments of internal marking, the focal spot 80 is positioned at least 50 microns beneath the surface 42 of the substrate 44. For some embodiments of internal marking, the focal spot 80 is positioned at least 100 microns beneath the surface 42 of the substrate 44.

Applicant discovered that use of a subsurface focal spot 80 in combination with the use of picosecond lasers, which produce laser pulsewidths in the range from 1 to 1,000 picoseconds, provided a good way to reliably and repeatably create marks within some transparent semiconductor substrates 44, such as sapphire. In some embodiments, pulsewidths in a range from 1 to 100 ps can be employed. In some embodiments, pulsewidths in a range from 5 to 75 ps can be employed. In some embodiments, pulsewidths in a range from 10 to 50 ps can be employed. It is speculated that femtosecond laser, producing wavelengths in the 10- to 1000-femtosecond range, could alternatively provide good results. An advantage of using picosecond lasers, however, is that they are much less expensive, require much less maintenance, and typically have much longer operating lifetimes than existing femtosecond lasers.

Although marking can be accomplished at a variety of wavelengths as previously discussed, applicant found that IR lasers operating in the picosecond ranges provide particularly repeatable good results. Wavelengths at or near 1064 nm were particularly advantageous. An exemplary laser 50 was a Lumera 6 W laser. It will be appreciated that fiber lasers or other types of lasers could be employed.

Similar parameters can also be used to make invisible subsurface marks in metals or coated metals, such as anodized aluminum. Tailoring marking for anodized aluminum substrates 44 is described in detail in U.S. Pat. No. 8,379,679 and U.S. Pat. Pub. No. 2013-0208074, both of Haibin Zhang et al., both of which are assigned to the assignee of this application, and both of which are incorporated herein by reference.

As previously discussed, transparent semiconductor substrate materials can be marked internally by selectively directing laser output at the substrate material. Internal marking of the substrate 44 retains the integrity of the surface 42, such as its water and dirt resistance. Internal marking also reduces crack propagation and other adverse effects created by surface marking.

Figure 8:
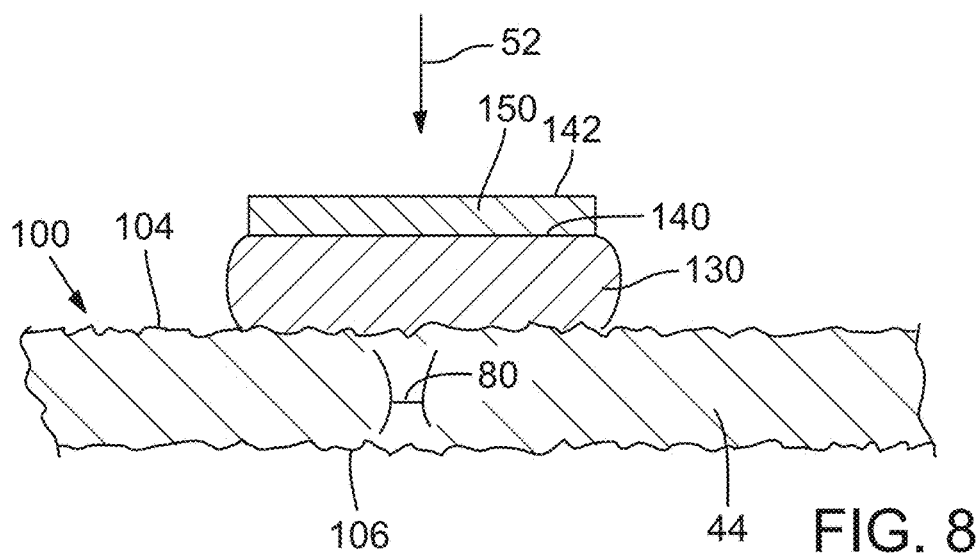
FIG. 8 is a cross sectional side view of a sapphire wafer having a rough surface covered by a coating material and a cover.

With reference to FIG. 8, applicant has also noted that wafers 100 or other semiconductor substrate materials cut from ingots tend to have surfaces 104 and 106 that have rough surface texture. The surface texture of these surfaces 104 and 106 in their native states can adversely affect optical properties of the laser pulses 52 directed at the substrate 44 of the wafer 100.

Applicant has also determined that substrates 44 of wafers 100 having a surface 104 or 106 with rough texture, such as an unpolished surface, can be difficult to mark internally without causing damage to the surface 104 or 106.

The adverse optical effects of the rough surfaces can be mitigated by employing a coating material 130 that effectively provides a flat surface 140 or 142 to receive the laser output 110. The flat surface 140 represents the upper surface of the coating material 130. The flat surface 142 is the flat surface of a cover 150 for the coating material 130. The coating material 130 has a coating refractive index that is optically compatible with the substrate refractive index.

The coating refractive index may be within 2 of the refractive index of the substrate refractive index (such as at 25 degrees Celsius). The coating refractive index may be within 1 of the refractive index of the substrate refractive index. The coating refractive index may be within 0.5 of the refractive index of the substrate refractive index. The coating refractive index may be within 0.2 of the refractive index of the substrate refractive index. The coating refractive index may be between 1.2 and 2.5. The coating refractive index may be between 1.5 and 2.2. The coating refractive index may be between 1.7 and 2.0. The coating refractive index may be between 1.75 and 1.85. The cover may also have matching refractive indices in these ranges.

The coating material 130 may comprise a fluid, a gel, or an oil. The coating material 130 may have a boiling point that is greater than 180 degrees Celsius (such as at 760 mm Hg). The coating material may have a density of between 2 and 5 g/cc (such as at 25 degrees Celsius). The coating material 130 may have a density of between 2.5 and 4 g/cc. The coating material may have a density of between 3 and 3.5 g/cc.

In some embodiments, the coating material 130 may comprise methylene iodide. The coating material 130 may comprise a gem refractometer liquid. The coating material 130 can maintain fluidic properties during laser processing. The coating material 130 may comprise a leveling composition. The coating material 130 is preferably easy to remove from the rough surface after laser processing. The coating material 130 can be cleaned from the rough surface by acetone, carbon tetrachloride, ethyl ether, methylene chloride, toluene, xylene, or a combination thereof, or the coating material 130 can be cleaned from the rough surface by water, or the coating material 130 can be cleaned from the rough surface by alcohol.

The cover 150 may be transparent to the laser wavelength. The cover 150 may comprise the substrate material. The cover 150 may comprise a smooth cover surface that is nonreflective at the wavelength. The cover 150 may comprise a glass. The cover 150 may comprise a sapphire, diamond, silicon, or plastic.

These rough surface-mitigation techniques are described in U.S. Prov. Pat. Appl. No. 61/912,192 of Haibin Zhang et al., which is incorporated herein by reference.

Although the foregoing description has been made herein by way of example to 2DID codes, skilled persons can appreciate that by utilizing depth control for marking transparent substrates 44, 3D codes employing spots 32 can be constructed.

An optical mark reader 220 can be designed to read the spots 32 and decode the 2DID codes despite the spots 32 being invisible to the human eye or internal to the substrate 44. FIGS. 9-15 show simplified partly schematic side elevation views of some components of exemplary optical mark readers 220a-220g (generically optical mark reader 220) suitable for reading the spots 32 of a modified 2DID code.

Figure 9:
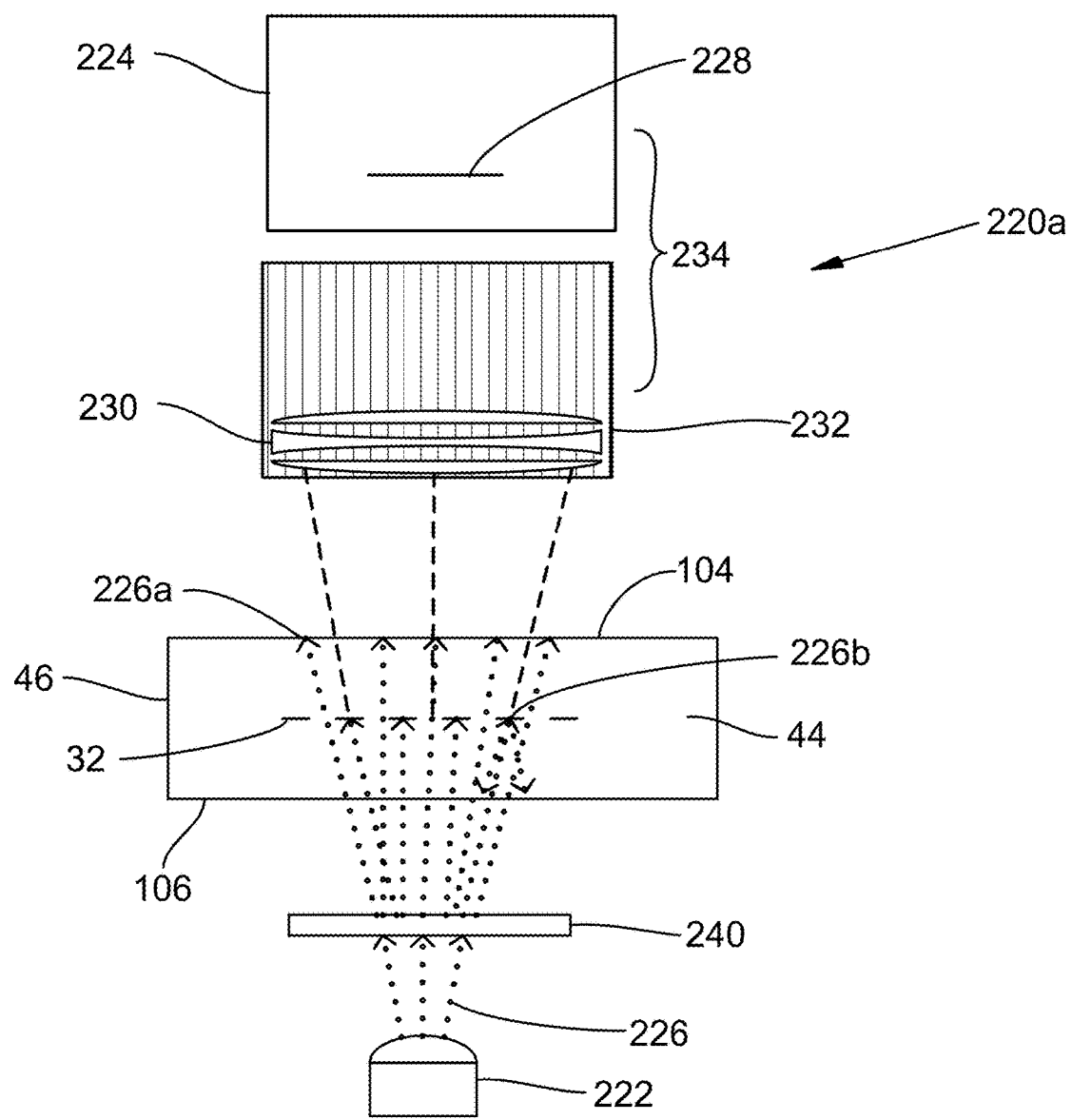
FIG. 9 is simplified partly schematic side elevation view of some components of an exemplary optical mark reader suitable for reading the spots of a modified 2DID code.

With reference to FIG. 9, the exemplary optical mark reader 220a employs a light source 222 and an imaging microscope system including a video microscope unit 234. In some embodiments, the light source 222 can be positioned to propagate the light rays 226 along an illumination path that traverses the bottom surface 106, and the imager 228 and the optics 230 are positioned along an imaging path operable to receive the light rays 226a emitted from the upper surface 104. In some particular embodiments, the light source 222 and a camera 224 can be positioned on opposite sides of the workpiece 46 such that light rays 226 emitted from the light source 222 pass through the substrate 44 to reach an imager 228 of the camera 224. In some embodiments, the illumination path traverses the lower surface 106 at a perpendicular angle. In some embodiments, the light source 222 is positioned along an illumination axis that is generally perpendicular to the first surface of the substrate 44. In some embodiments, the imager 228 is positioned along an imaging axis that is generally perpendicular to the upper surface of the substrate 44. In some embodiments, the illumination axis and the imaging axis are parallel. In some embodiments, the illumination axis and the imaging axis are collinear.

In some particular embodiments, the light source 222 and the camera 224 can be positioned on the same side of the workpiece 46 even when the light rays 226 emitted from the light source 222 pass through the substrate 44 to reach an imager 228 if mirrors (not shown) are used. For example, the light source 222 can be positioned to propagate the light rays 226 along an illumination path that traverses the bottom surface 106, and a mirror positioned along an imaging path operable to receive the light rays 226a emitted from the upper surface 104 and to reflect the light rays 226a to an imager 228 and optics 230 positioned at an elevation beneath the bottom surface 106 (without the light rays 226a necessarily passing through the workpiece 46 a second time). Moreover, some embodiments rely on reflection of the light rays 226, in which cases the light source 222 and the camera 224 may generally be positioned on the same side of the workpiece 46.

The light source 222 can be of almost any variety that may be paired with cooperative (microscope) optics 230 and imagers 228. In some embodiments, the light source 222 emits monochromatic light to remove some potentially adverse consequences of chromatic aberration. In some embodiments, the light source 222 is capable of being strobed at high intensities such as greater than or equal to ten times the steady state for short intervals, such as milliseconds or tens of milliseconds. In some embodiments, the light source 222 is a light-emitting diode (LED) or a group of LEDs, such as an array of LEDs. LEDs are relatively inexpensive and exhibit many desirable properties for the lighting applications associated with the techniques disclosed herein.

In some embodiments, such as in the relative positioning of components shown in FIG. 9, the light source 222 is positioned along an axis (not shown) that is generally perpendicular to the bottom surface 106 of the substrate 44 and generally perpendicular to the image plane of the imager 228. In some embodiments, the light source 222 is positioned along a first axis that is generally perpendicular to the bottom surface 106 of the substrate 44 and parallel to a second axis that is generally perpendicular to the image plane of the imager 228, such that the light source 222 is positioned to have an angle of incidence with respect to the imager 228. In some embodiments, the light source 222 is positioned along the second axis that is generally perpendicular to the imager 228 but at an angle of incidence with respect to the imager 228.

The light source 222 may emit light rays 226 comprising any suitable wavelength. Exemplary suitable visible wavelengths for light source 222 may include, but are not limited to, one or more of the following wavelengths: 660 nm, 635, nm, 633 nm, 623 nm, 612 nm, 592, nm, 585 nm, 574 nm, 570 nm, 565, nm, 560 nm, 555 nm, 525 nm, 505, nm, 470 nm, and 430 nm. These wavelengths may be employed individually or in combination. In some exemplary embodiments, including a prototype, a red wavelength such as 635 nm has been employed. Nonvisible wavelengths such as those in the UV range or IR range could alternatively or additionally be employed.

In some embodiments, light source 222 may include a multispectral emission source. If only one or more specific wavelengths are to be imaged, one or more wavelength filters can be employed to block undesired wavelengths, or one or more monochromatic cameras 224 can be employed to limit data acquisition to specified wavelength(s).

In some embodiments, light source 222 may include emission sources that emit different specific wavelengths. In some embodiments, a monochromatic camera 224 can be employed to enhance contrast determination when specific multiple wavelengths are employed, especially where the wavelengths are selected based on the colorimetric properties of dopants or impurities in the substrate 44. Exemplary emission wavelengths may include a red, blue, and green emission scheme; a red, infrared, and green emission scheme; or a red, infrared, blue, and green emission scheme. However, other emission schemes can be employed.

Contrast analysis may employ the techniques disclosed in U.S. Pat. No. 7,589,869, which is assigned to assignee of this application, which is incorporated herein by reference, and which describes a method to improve image quality in images captured via monochromatic cameras using multi-wavelength lighting. A contrast optimization algorithm determines which particular wavelength among those available is most suitable to maximize contrast. The quality of the image can be further improved through active noise cancellation by determining the lighting schemes that provide maximum and minimum contrast between a target and a background. The elimination of image texture data (i.e., noise) is then accomplished through pixel-by-pixel division of the maximum by the minimum contrast image, for example. Alternatively, images (or image data therefrom) obtained using at least two wavelengths can be algebraically combined for noise reduction. The resulting composite image data can be fed into any known target identification algorithm.

The camera 224 can be of almost any variety that may be paired with cooperative optics 230 and light sources 222. As previously discussed, the camera 224 may be full color, monochromatic, or selective for a plurality of specific wavelengths. It will be appreciate that optional wavelength-selective filters (not shown) may be employed in greater proximity to either the camera 224 or the light source 222, or the optional wavelength-selective filters may be placed in proximity to both the camera 224 and the light source 222.

Exemplary imagers 228 include VGA imagers (CCD or CMOS) with a resolution of 688×488, 1032×776, 1288×946, 1280×1024, 1384×1032, 1624×1224, or 2448×2048 pixels. However, other suitable type of imagers 228 of various resolutions may be employed. An exemplary embodiment of a prototype of an optical mark reader 220 employed a Flea®2 camera from Point Grey Research, Inc. of Richmond, B.C., Canada.

The optics 230 may include one or more lenses 232. Lenses 232 may include distinct lens pieces or may be a single compound lens piece. Exemplary optics 230 provide from two times to 50 times magnification. In some embodiments, the optics 230 provides greater than or equal to fives times magnification. In some embodiments, the optics 230 provides greater than or equal to ten times magnification. In some embodiments, the optics 230 provides greater than or equal to five times magnification and less than or equal to 20 times magnification. In many embodiments, the optics 230 include an objective lens 232. An exemplary embodiment of a prototype of optical mark reader 220 employed a 10×∞ corrected plan achromat objective lens (Plan Apo Infinity-Corrected Long WD Objective lens) from Mitutoyo America Corporation of Aurora, Ill., USA. In some embodiments, the optics 230 and the camera 224 are assembled in a microscope unit 234. A prototype that employed an exemplary video microscope unit 234, which can house the camera 224 and the optics 230, included a video microscope unit (VMU) from Mitutoyo America Corporation of Aurora, Ill., USA.

An exemplary range of the depth of field for the optics 230 is about +/−50 μm. In some embodiments, the range of the depth of field for the optics 230 is about +/−10 μm, such as when five times magnification is employed. In some embodiments, the range of the depth of field for the optics 230 is about +/−2.5 μm, such as when ten times magnification is employed.

An exemplary range for field of view (FOV) of the imager 228 (in combination with the optics 230) is from about 500 μm to about 1.2 mm. In some embodiments, the range for the field of view is greater than or equal to about 1 mm, such as when five times magnification is employed. In some embodiments, the range for the field of view is greater than or equal to about 1.5 mm, such as when five times magnification is employed.

In some embodiments, the range for the field of view is greater than or equal to about 500 μm, such as when ten times magnification is employed. In some embodiments, the range for the field of view is greater than or equal to about 800 μm, such as when ten times magnification is employed. In some embodiments, the range for the field of view is greater than or equal to about 800 μm, such as when five times magnification is employed. In some embodiments, the range for the field of view is smaller than or equal to about 800 μm, such as when ten times magnification is employed.

The ISO standard calls for minimum x and y dimensions of a field size of a 2DID code to be greater than or equal to 255 μm. The optics 230 provide the capability to reliably read 2DID codes that have a field size with a side dimension smaller than 500 microns. In some embodiments, the optics 230 provide the capability to reliably read 2DID codes that have a field size with a side dimension smaller than 250 microns. In some embodiments, the optics 230 provide the capability to reliably read 2DID codes that have a field size with a side dimension smaller than 125 microns, such as with an objective lens 232 providing ten times magnification.

In some embodiments, the optics 230 provide the capability to reliably read 2DID codes that have a field size with two dimensions smaller than 250 microns. In some embodiments, the optics 230 provide the capability to reliably read 2DID codes that have a field size with two dimensions smaller than 125 microns.

In some embodiments, the microscopic unit 234 is capable of achieving a modulation transfer function (MTF) of greater than 50 line pairs/millimeter. In some embodiments, the microscopic unit 234 is capable of achieving an MTF of greater than 75 line pairs/millimeter. In some embodiments, the microscopic unit 234 is capable of achieving an MTF of greater than 80 line pairs/millimeter. In some embodiments, the microscopic unit 234 is capable of achieving an MTF of greater than 90 line pairs/millimeter. In some embodiments, the microscopic unit 234 is capable of achieving an MTF of greater than 100 line pairs/millimeter. In some embodiments, the microscopic unit 234 is capable of achieving an MTF of greater than 125 line pairs/millimeter.

With reference again to FIG. 9, the optical mark reader 220*a* may employ a diffuser 240 positioned between the light source 222 and the substrate 44. The light rays 226 emitted from the light source 222 are diffused by the diffuser 240 and propagate into the substrate 44. Some of the light rays 226*a* pass between the spots 32 that form pieces of the data points (groups 30 or squares) of the 2DID codes. These light rays 226*a* reach the imager 228 of the camera 224. Some of the light rays 226*b* are intercepted by the spots 32 and are attenuated and diffused. The spots 32 cause a local increase in apparent optical density due to scattering of the light rays 226b that propagate into the substrate 44. The light rays 226b do not reach the imager 228 of the camera 224. Thus, the spots 32 appear as dark shadows against a light background.

The embodiment described with respect to FIG. 9 may be particularly useful for reliably reading the spots 32 in a polished substrate 44 having surfaces 104 and 106 that are effectively transparent to the wavelength(s) of the light rays 226.

Figure 10:
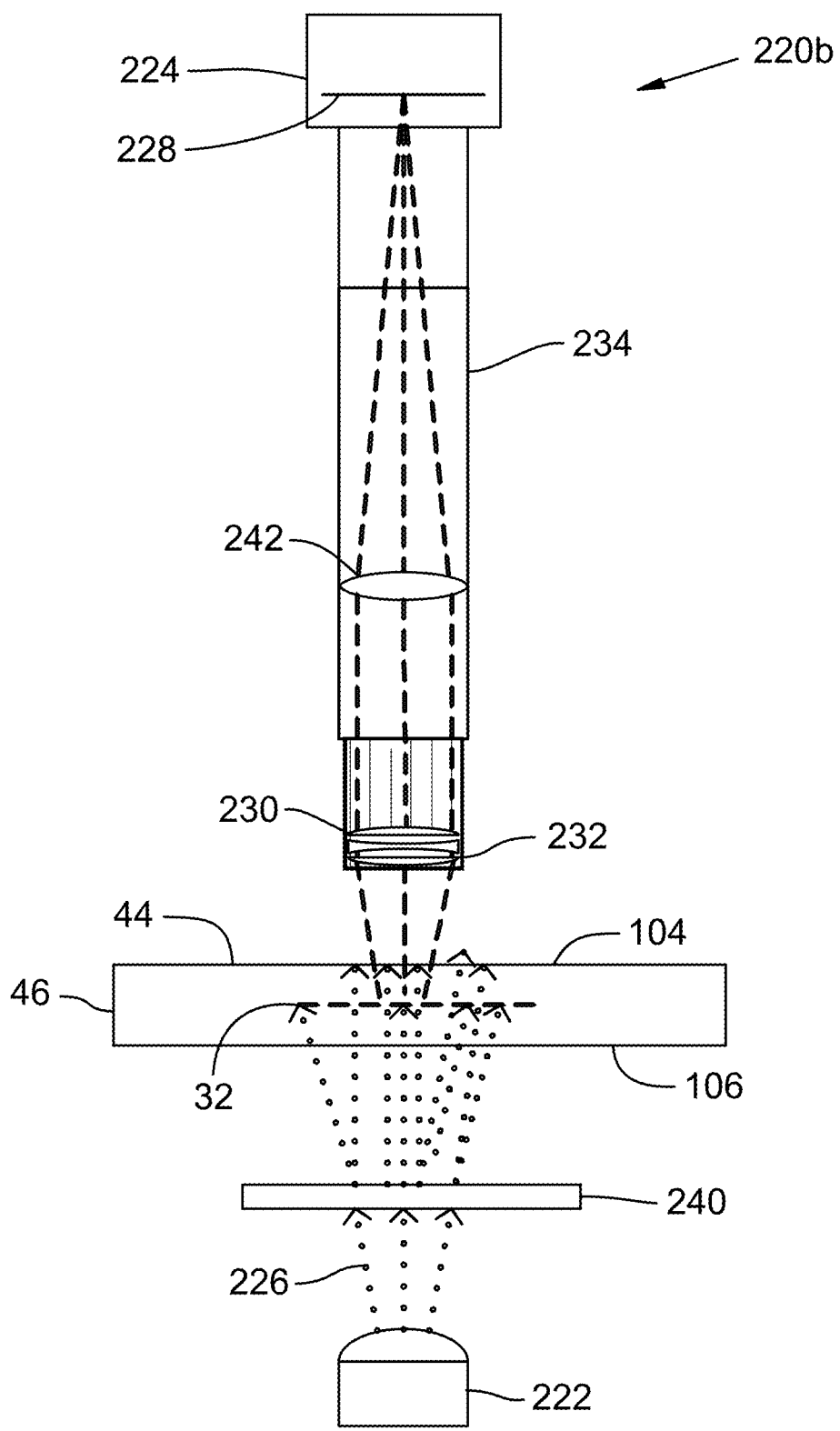
FIG. 10 is simplified partly schematic side elevation view of some components of another exemplary optical mark reader suitable for reading the spots of a modified 2DID code.

FIG. 10 shows a partly schematic side elevation view of some components of another exemplary optical mark reader 220b suitable for reading the spots 32 of a modified 2DID code. Many of the components depicted in FIG. 10 have similar functions to corresponding components depicted in FIG. 9 and have been provided with corresponding reference numerals regardless of whether the specific components are exactly the same or may be different. With reference to FIG. 10, the video microscope unit 234 employs an elongated tube that houses a tube lens 242 positioned optically between the imager 228 and the objective lens 232 of the optics 230.

The embodiment described with respect to FIG. 10 may also be particularly useful for reliably reading the spots 32 in a polished substrate 44 having surfaces 42 that are effectively transparent to the wavelength(s) of the light rays 226.

Figure 11:
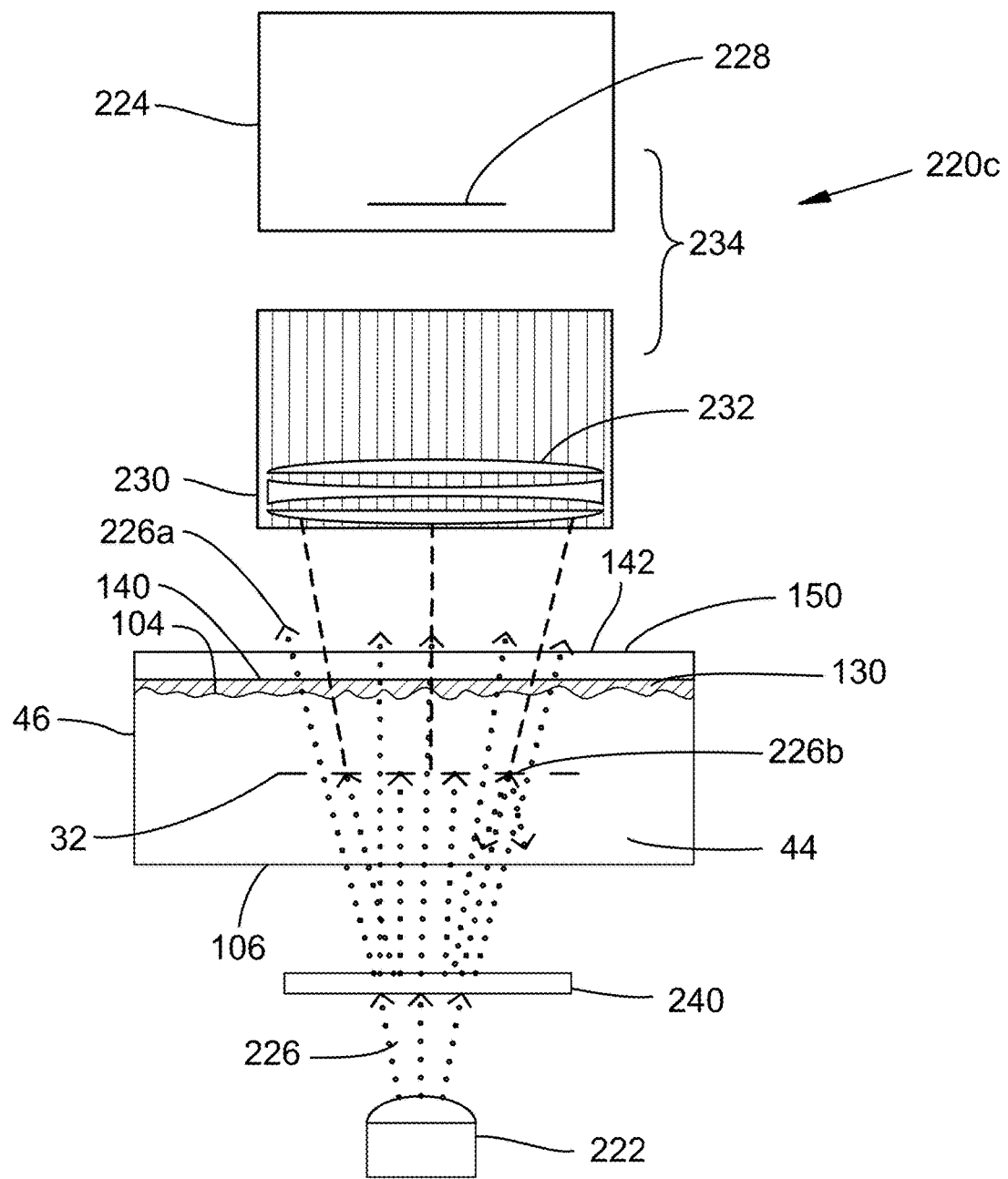
FIG. 11 is simplified partly schematic side elevation view of some components of a further exemplary optical mark reader suitable for reading the spots of a modified 2DID code.

FIG. 11 shows a partly schematic side elevation view of some components of another exemplary optical mark reader 220c suitable for reading the spots 32 of a modified 2DID code. Many of the components depicted in FIG. 11 have similar functions to corresponding components depicted in FIG. 9 and have been provided with corresponding reference numerals regardless of whether the specific components are exactly the same or may be different. With reference to FIG. 11, the workpiece 46 may be an unpolished workpiece 46 such as the wafer 100 shown in FIG. 8. In particular, the unpolished workpiece 46 may have one or more surfaces 104 and 106 that are rough or saw-cut with surface deviations that may be about +/−5 microns, for example. The surfaces 104 and 106 with rough surface texture can blur or otherwise adversely affect the images of the shadows of the subsurface spots 32.

Thus, with reference to FIG. 8 and its description, one or both surfaces 104 and 106 of the workpiece 46 of FIG. 11 can be covered with an index-matching fluid 130 to mitigate the surface deviations in surfaces 104 and 106. Moreover, a smooth cover 150 may also be used to cover the index-matching fluid 130.

The index-matching fluid 130 and the cover 150 can reduce the adverse effects of the surfaces 104 and 106 having rough surface texture so that the imager 228 can accurately discern the shadows created by the spots 32.

Figure 12:
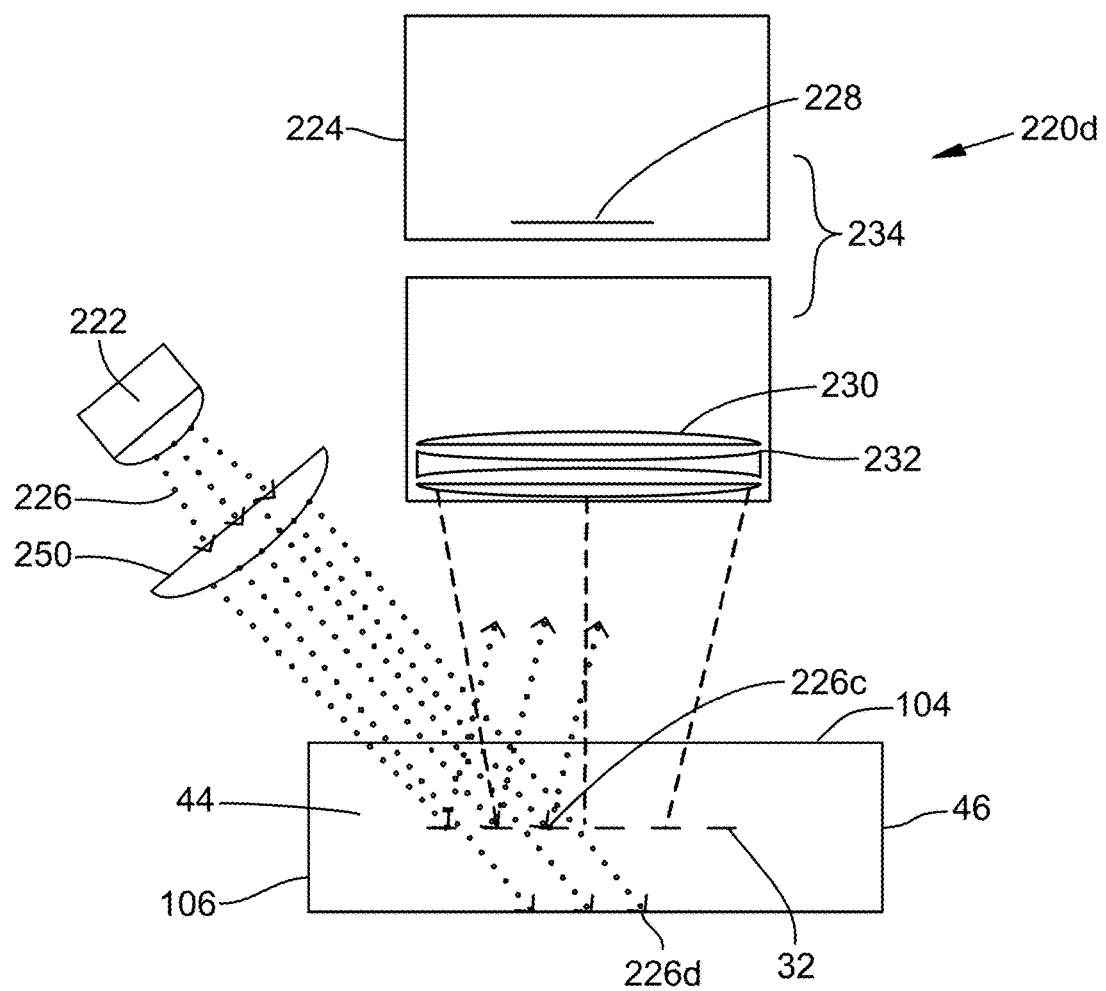
FIG. 12 is simplified partly schematic side elevation view of some components of yet another exemplary optical mark reader suitable for reading the spots of a modified 2DID code.

FIG. 12 shows a partly schematic side elevation view of some components of another exemplary optical mark reader 220d suitable for reading the spots 32 of a modified 2DID code. Many of the components depicted in FIG. 12 have similar functions to corresponding components depicted in FIG. 9 and have been provided with corresponding reference numerals regardless of whether the specific components are exactly the same or may be different. With reference to FIG. 12, the workpiece 46 has a substrate 44 with a dark opaque bottom surface 106. In some embodiments, the substrate 44 is transparent and the bottom surface 106 is coated with a dark or light-absorbent material. The light-absorbent material can be selected to be absorbent to the emission wavelength(s) of the selected light source 222, and/or the light sources can be selected to provide emission wavelength(s) in a range absorbed by the bottom surface 106 or its coating.

In FIG. 12, the light source 222 and the imager 228 are respectively positioned to direct light at, and receive light from, the same (upper) surface 104 of the substrate 44. In particular, the light source 222 is positioned to propagate the light 226 along an illumination path that traverses the upper surface 104, and the imager 228 and optics 230 are positioned along an imaging path that transverses the upper surface and are operable to receive the light 226c propagating through the upper surface 104. In some embodiments, the light source 222 directs the light rays 226 at a non-perpendicular angle of incidence to the upper surface 104 of the substrate 44. In some embodiments, the light source 222 has an illumination axis with an angle of incidence of between 1 and 70 degrees. In some embodiments, the illumination axis of the light source 222 has angle of incidence of between 10 and 65 degrees. In some embodiments, the illumination axis of the light source 222 has angle of incidence of that is less than or equal to 60 degrees.

With reference again to FIG. 12, the light rays 226 may be directed through a focusing lens 250 to propagate into the substrate 44. Some of the light rays 226c intersect with the spots 32 and are reflected to impinge on the imager 228. Some of the light rays 226d pass between the spots 32 and are absorbed by the dark bottom surface 106 of the substrate 44 or its wavelength-selective absorbent coating. To the imager 228, the spots 32 appear as bright marks against a dark background. Contrast inversion (e.g. light to dark and vice versa) and feature enhancement algorithms in machine vision software yield a reliably readable 2DID pattern based on the spots 32 whose groups 30 each represent a data point (or square). The spots 32 appear as bright marks against a dark background.

Figure 13:
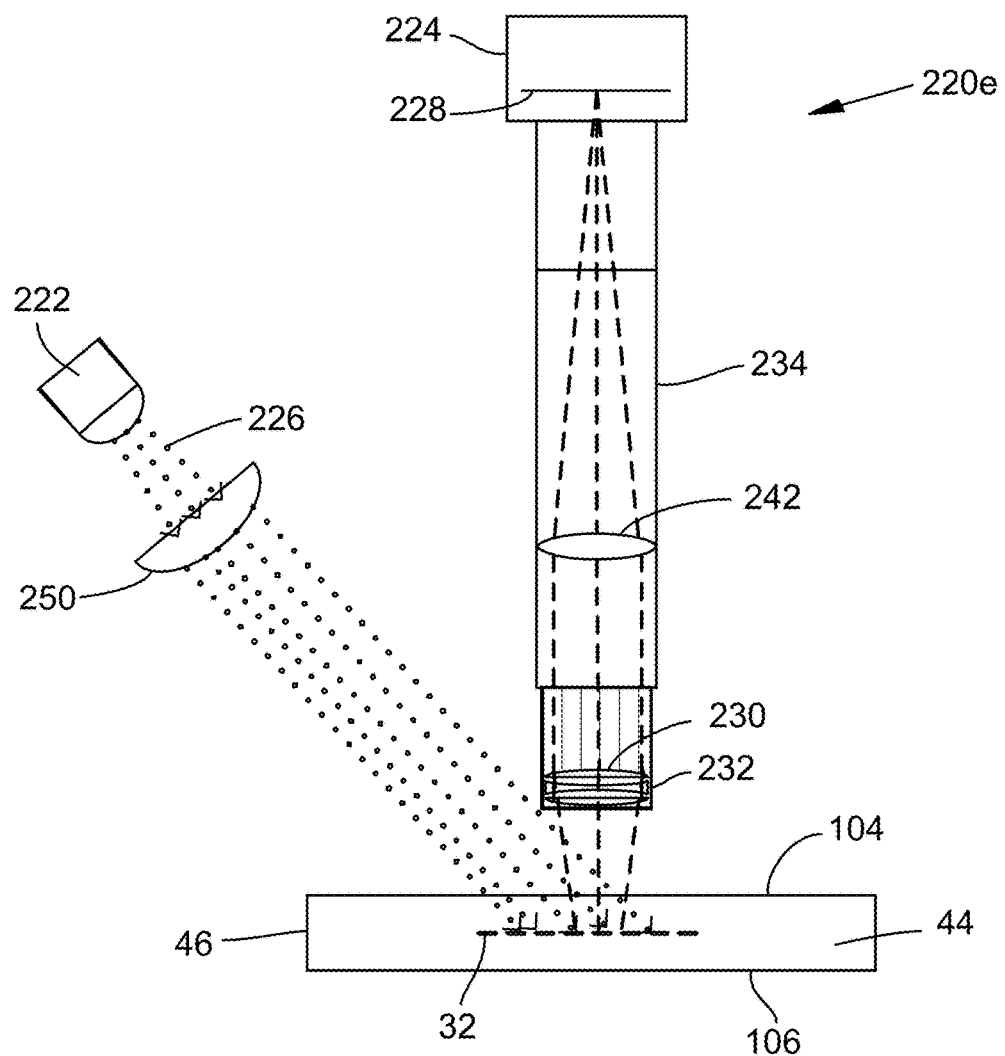
FIG. 13 is simplified partly schematic side elevation view of some components of still another exemplary optical mark reader suitable for reading the spots of a modified 2DID code.

FIG. 13 shows a partly schematic side elevation view of some components of another exemplary optical mark reader 220e suitable for reading the spots 32 of a modified 2DID code. Many of the components depicted in FIG. 13 have similar functions to corresponding components depicted in FIG. 12 and have been provided with corresponding reference numerals regardless of whether the specific components are exactly the same or may be different. With reference to FIG. 13, the video microscope unit 234 employs an elongated tube that houses a tube lens 242 positioned optically between the imager 228 and the objective lens 232 of the optics 230. As with the optical mark reader 220d, the optical mark reader 220e is adapted to read the spots 32 in substrates 44 having a dark, or darkly coated, bottom surface 106.

Figure 14:
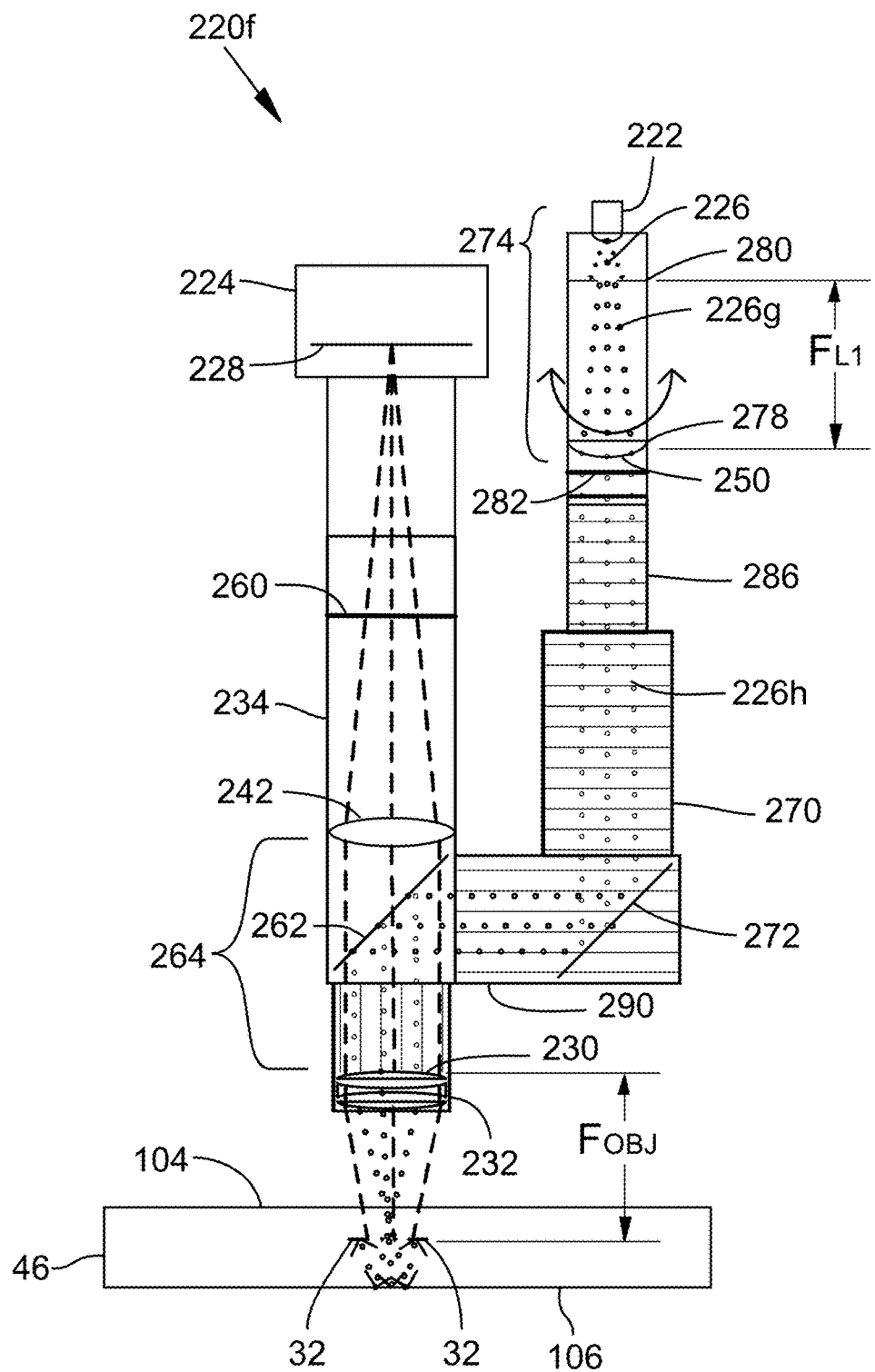
FIG. 14 is simplified partly schematic side elevation view of some components of still another exemplary optical mark reader suitable for reading the spots of a modified 2DID code.
Figure 15:
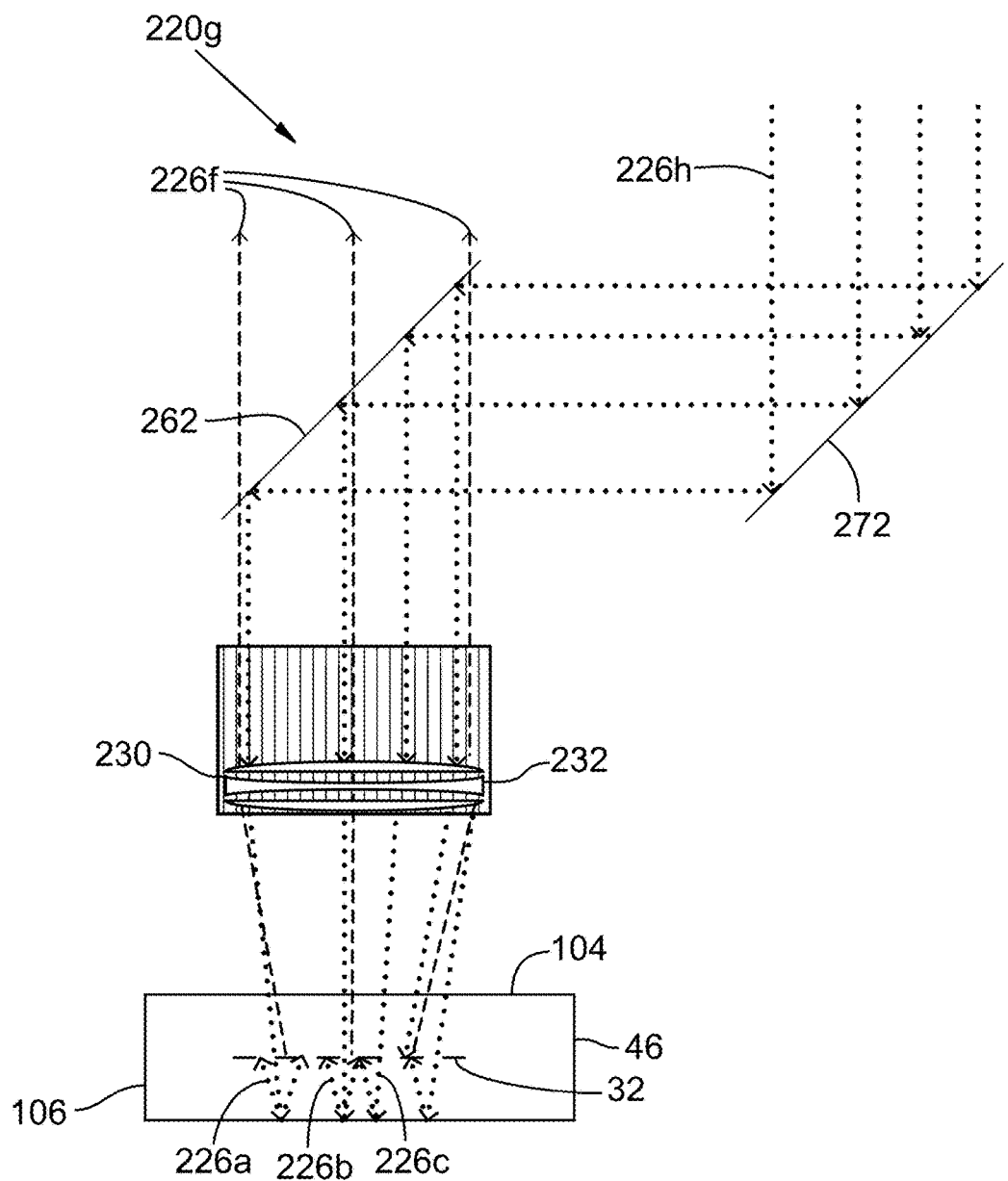
FIG. 15 is simplified partly schematic side elevation view of some enlarged portions of FIG. 14.

FIG. 14 shows a side elevation view of some components of another exemplary optical mark reader 220f suitable for reading the spots 32 of a modified 2DID code, and FIG. 15 shows enlarged portions of FIG. 14. Many of the components depicted in FIG. 14 have similar functions to those depicted in FIG. 13 and have been provided with corresponding reference numerals regardless of whether the specific components are exactly the same or may be different, or may be positioned in different relative locations or orientations.

With reference to FIG. 14, the workpiece 46 has a substrate 44 with a light, white, or off-white opaque bottom surface 106. In some embodiments, the substrate 44 is transparent and the bottom surface 106 is coated with a light or reflective material. The reflective material can be selected to be reflective to the emission wavelength(s) of the selected light source 222, and/or the light sources can be selected to provide emission wavelength(s) in a range reflected by the bottom surface 106 or its coating.

In the exemplary optical mark reader 220f shown in FIG. 14, an imaging tube 236 of the microscope unit 234 additionally houses a tube linear polarizer 260 positioned along the image path between the imager 228 and the tube lens 242. In some embodiments, the tube lens 242 and the objective lens 232 cooperate to define a collimated space 264 between them. The microscope unit 234 also houses a beam-splitting mirror 262 positioned along the image path in the collimated space 264 between the tube lens and the objective lens 232 of the optics 230. In some embodiments, the position of the objective lens 232 with respect to the spots 32 defines a focal distance $F_{OBJ}$. The beam-splitting mirror 262 permits some of the light rays 226 reflected from opaque bottom surface 106 to propagate along the image path toward the tube linear polarizer 260 and the imager 228.

The exemplary optical mark reader 220f also employs a lighting tunnel 270, which may be oriented to be parallel to the imaging tube 236 of the microscope unit 234, as shown in FIG. 14. It will be appreciated that the lighting tunnel 270 may be oriented to be perpendicular to the imaging tube 236, or they may have an alternative orientation to each other than can be accommodated by one or more illumination path mirrors 272.

The lighting tunnel 270 can be adapted to house or support an illumination system 274 that includes the light source 222, one or more collimation lenses 278, and an aperture 280. The collimation lens 278 is positioned along the illumination path between the light source 222 and the workpiece 46, and the aperture is positioned along the illumination path between the light source 222 and the collimation lens 278. In some embodiments, the position of the aperture 280 with respect to the collimation lens 278 defines a distance FLA. The aperture 280 can have a major spatial axis or diameter that is a function of the focal distance $F_{OBJ}$ and the distance $F_{L1}$. In some embodiments, the diameter or major spatial axis of the aperture 280 is a function of $F_{L1}/F_{OBJ}$. Alternatively, the focal distance $F_{OBJ}$ and the distance $F_{L1}$ can be adjusted to be a function of the diameter or major spatial axis of the aperture 280.

In some embodiments, the lighting tunnel 270 or the illumination system 274 also includes a tunnel linear polarizer 282, which may be positioned along the illumination path between the collimation lens 278 and the workpiece 46. The tunnel linear polarizer 282 and/or the light source 222 may be rotatable about the axis of the illumination path to enhance image contrast.

The lighting tunnel 270 may also include a tunnel adapter 286 to change the diameter of the lighting tunnel from one diameter to another, such as from a smaller diameter to a larger diameter. A tunnel section 290 of lighting tunnel 270 that intersects the imaging tube 236 may have the same diameter as that of the imaging tube 236.

In the exemplary embodiments shown in FIG. 14, some of the light rays 226 emitted by the light source 222 propagate along the illumination path through the aperture 280. Such aperture light rays 226g propagate through the collimation lens 278. Such collimated light rays 226h may propagate through the optional tunnel linear polarizer. Such collimated (and polarized) light rays 226h may be reflected by one of more mirrors 270 to intersect with the beam splitting mirror 262, which reflects them through the objective lens 232 toward the workpiece 46.

With reference to FIGS. 14 and 15, the objective lens provides focused light rays 226i that reflect off the bottom surface 106 and propagate toward the spots 32 as light rays 226a. Some of the light rays 226a pass between the spots 32 that form pieces of the data points (groups 30 or squares) of the 2DID codes. These light rays 226a reach the imager 228 of the camera 224. Some of the light rays 226b are intercepted by the spots 32 and are attenuated and diffused. The spots 32 appear as dark shadows against a light background, such as described with respect to the embodiment shown in FIG. 9.

With respect to all of the described exemplary embodiments, it will be appreciated that the workpiece 46 and one or more components (such as the imager 228) of the optical code reader 220 may all be stationary during inspection of the spots 32. The workpiece 46 may be placed into an inspection position by a conveyor, a chuck, or other transport mechanism. In an exemplary embodiment, the workpiece 46 would be held stationary in X, Y and Z axes, and one or more optical components of the microscope unit 234 would be move in the Z axis to auto focus.

However, either the workpiece 46 may be in motion while the optical 2DID code is inspected, or one or more components of the optical code reader 220 may be in motion while the optical 2DID code is inspected. Such motion might include X or Y motion and/or Z motion (that may focus related). Alternatively, both the workpiece 46 and one or more components of the optical code reader 220 may be in motion while the optical 2DID code is inspected.

In some embodiments in which movement and code inspection are concurrent, the light source 22 can be strobed to prevent blurring. For example, in an exemplary embodiment, the spots 32 have a diameter of about 2 microns and the X/Y motion can be held within one quarter of that, such as about 0.5 microns. If the depth of the video microscope unit 234 is about 5 microns, desirable strobing could entail a short enough light pulse to hold the image of the spots 32 (or 2DID code) to within about 1.25 microns. Because DD=V/T, the strobe interval would be inversely proportional to velocity.

In some embodiments, the optical mark reader employs a commercially available standard software package for decoding the 2DID code (e.g., GS1 data matrix). In some embodiments, the standard software package is enhanced by image and contrast enhancement techniques such as those described in U.S. Pat. No. 7,589,869.

In some alternative, additional, or cumulative embodiments, the standard software package is enhanced by techniques for determining the correlation of groups 30 of spots 32 to data points (dark squares). In some embodiments, the enhanced or adapted software is provided with criterion for the spots 32 and/or groups 30 of spots 32. The criterion may be similar to those used for selection of spot and group formation, as previously discussed. Such criterion may include one or more of, but are not limited to, spatial major axis of the spots 32, distance between the spots 32, distance between the groups 30 of the spots 32, indication of whether the spots 32 are members of more than one group 30, dimensions of the groups 30, approximate location of particular spots 32 or groups 30, and the depth of the spots 32 within the substrate 44. These values can be correlated with each representation of a 2DID code, for example, and stored in a look-up table. The software or look-up table may also include acceptable deviation information based on accuracy and other characteristics of the laser micromachining system 40 employed for making the spots.

The optical mark reader 220 can, therefore, read the spots 32 and determine groups 30 (and data points or squares) to which they belong, and then decode the 2DID pattern that the groups 30 of spots represent. It will be appreciated that the software can also disregard defects or imperfections that may appear in the substrates 44 because these defects are statistically unlikely to meet the criterion for the spots 32 or the relative or absolute locations for the spots 32 within the groups 30 established by intended spots 32.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for reading a two-dimensional identification code within a substrate having first and second opposing surfaces, comprising:
   directing light toward a first surface of the substrate, wherein the light has a wavelength, and wherein the substrate is transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein a first portion of the light is blocked by the spots, and wherein a second portion of the light passes beyond the spots and propagates through the second surface of the substrate;
   magnifying the second portion of the light that propagates through the second surface of the substrate;
   imaging with an imager the second portion the light that propagates through the second surface of the substrate and is magnified;
   analyzing an image of the second portion of the light and shadows caused by blockage of the first portion of the light to determine the distribution of the spots; and
   determining the two-dimensional code based on the distribution of the spots imaged by the imager.

2. The method of claim 1, wherein the step of magnifying employs an optical system capable of achieving a modulation transfer function of greater than 80 line pairs/millimeter.

3. The method of claim 1, wherein the representative geometric shape is a rectangular geometric shape, and wherein the first and second groups of spots are positioned to represent corners of the rectangular geometric shape.

4. The method of claim 1, wherein the array has an array dimension that is smaller than 500 microns.

5. The method of claim 1, wherein the first and second groups of spots are invisible to the human eye at a distance of greater than or equal to 25 mm from the human eye.

6. The method of claim 1, wherein the spots of the first and second groups each have a dimension for a major spatial axis that is smaller than 35 microns.

7. The method of claim 1, wherein the spots each have a dimension for a major spatial axis, and wherein the spots are separated by a distance that is greater than or equal to four times the dimension of the major spatial axis.

8. The method of claim 1, wherein the spots are dark and the substrate is light.

9. The method of claim 1, wherein the spots are dark, and wherein the substrate is substantially transparent to visible light.

10. The method of claim 1, wherein the substrate comprises at least one of a crystalline material, a noncrystalline material, sapphire, glass, plastic, and aluminum.

11. The method of claim 1, wherein the group of spots provides a signal to noise ratio of greater than or equal to 10.

12. The method of claim 1, wherein the array comprises at least 50 geometric areas in a row or a column.

13. The method of claim 1, wherein the light source is positioned to propagate the light along an illumination path that traverses the first surface, and wherein the illumination path traverses the first surface at a perpendicular angle.

14. The method of claim 1, wherein the light source is positioned to propagate the light along an illumination path that traverses the first surface, and wherein the light source is positioned along an illumination axis that is generally perpendicular to the first surface of the substrate.

15. The method of claim 14, wherein the imager is positioned along the illumination axis.

16. The method of claim 1, wherein the light source is positioned to propagate the light along an illumination path that traverses the first surface, and wherein the light source is positioned along an illumination axis that has a non-perpendicular angle of incidence to the first surface of the substrate.

17. The method of claim 16, wherein the illumination axis has an angle of incidence of between 10 and 65 degrees.

18. The method of claim 1, wherein the imager is positioned along an imaging axis that is perpendicular to the first surface.

19. The method of claim 1, wherein the light is generated by a light source that comprises an LED.

20. The method of claim 1, wherein an optical system magnifies the second portion of the light that propagates through the second surface of the substrate, and wherein the optical system employs optics that provide greater than five times magnification.

21. The method of claim 1, wherein an optical system magnifies the second portion of the light that propagates through the second surface of the substrate, and wherein the optical system provides a depth of field within about +/−50 μm.

22. The method of claim 1, wherein an optical system magnifies the second portion of the light that propagates through the second surface of the substrate, and wherein the optical system provides a field of view that is greater than or equal to about 500 μm.

23. The method of claim 1, wherein the spots form a 2DID code having a field size with a side dimension smaller than 500 microns.

24. The method of claim 1, wherein the spots form a GS1 DataMatrix code having a field size with two dimensions smaller than 125 microns.

25. The method of claim 1, wherein each spot is formed by a laser pulse.

26. The method of claim 1, wherein one or more of the spots has a positioning accuracy with respect to a desired location that is worse than 5 microns.

27. The method of claim 1, wherein each spot has a spot area, wherein a cumulative spot area represents spot areas of the spots within one group of spots, wherein the distribution of spots in a group is spread over a group area, wherein the cumulative spot area is smaller than or equal to less than 5% of the group area.

28. The method of claim 1, wherein the imager is monochromatic.

29. The method of claim 1, wherein the imager is full color.

30. The method of claim 1, wherein an optical system magnifies the second portion of the light that propagates through the second surface of the substrate, and wherein the optical system provides a depth of field within about +/−10 µm.

31. The method of claim 1, wherein the geometric areas represent squares in a QR code.

32. A method for reading a two-dimensional identification code within a substrate having first and second opposing surfaces, comprising:
    directing light toward the first surface of the substrate, wherein the light has a wavelength, and wherein the substrate and its first surface are transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein a first portion of the light passes beyond the spots and is absorbed at the second surface, wherein the second surface or a coating applied thereon is absorptive to the wavelength, and wherein a second portion of the light passes beyond the spots and propagates through the second surface of the substrate through the first surface;
    magnifying the second portion of the light that propagates through the first surface;
    imaging with an imager the second portion of the light that propagates through the first surface and is magnified;
    analyzing an image of the second portion of the light and a dark background caused by absorption of the first portion of the light to determine the distribution of the spots; and
    determining the two-dimensional code based on the distribution of the spots imaged by the imager.

33. A method for reading a two-dimensional identification code within a substrate having first and second opposing surfaces, comprising:
    directing light toward the first surface of the substrate, wherein the light has a wavelength, and wherein the substrate and its first surface are transparent to the wavelength, wherein the two-dimensional code is represented by a distribution of spots within the substrate, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots, wherein some of the light passes beyond the spots and becomes reflected light by the second surface, wherein the second surface or a coating applied thereon is reflective to the wavelength, wherein a first portion of the reflected light is blocked by the spots, and wherein a second portion of the reflected light passes beyond the spots and propagates through the first surface of the substrate;
    magnifying the second portion of the reflected light that propagates through the first surface;
    imaging with an imager the second portion the reflected light that propagates through the second surface of the substrate and is magnified;
    analyzing an image of the second portion of the reflected light and shadows caused by blockage of the first portion of the reflected light to determine the distribution of the spots; and
    determining the two-dimensional code based on the distribution of the spots imaged by the imager.

* * * * *